United States Patent
Moore

(10) Patent No.: US 8,078,698 B2
(45) Date of Patent: Dec. 13, 2011

(54) METHODS, SYSTEMS, AND PRODUCTS FOR PRODUCING PERSONA-BASED HOSTS

(75) Inventor: Darryl Cynthia Moore, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 775 days.

(21) Appl. No.: 11/821,934

(22) Filed: Jun. 26, 2007

(65) Prior Publication Data

US 2009/0006525 A1 Jan. 1, 2009

(51) Int. Cl.
*G06F 15/177* (2006.01)

(52) U.S. Cl. ........ 709/220; 715/706; 705/306; 705/313; 705/314; 705/315

(58) Field of Classification Search .................... 709/220
See application file for complete search history.

(56) References Cited

U.S. PATENT DOCUMENTS

| | | | |
|---|---|---|---|
| 5,309,355 A | 5/1994 | Lockwood | |
| 6,032,129 A | 2/2000 | Greef | |
| 6,035,283 A | 3/2000 | Rofrano | |
| 6,088,731 A | 7/2000 | Kiraly | |
| 6,378,234 B1 * | 4/2002 | Luo | 341/22 |
| 6,453,294 B1 * | 9/2002 | Dutta et al. | 704/270.1 |
| 6,735,632 B1 * | 5/2004 | Kiraly et al. | 709/229 |
| 6,868,392 B1 | 3/2005 | Ogasawara | |
| 6,904,408 B1 | 6/2005 | McCarthy | |
| 7,184,540 B2 | 2/2007 | Dezonno | |
| 2001/0032140 A1 | 10/2001 | Hoffman | |
| 2002/0008716 A1 * | 1/2002 | Colburn et al. | 345/706 |
| 2002/0198760 A1 * | 12/2002 | Carpenter et al. | 705/10 |
| 2003/0028498 A1 | 2/2003 | Hayes-Roth | |
| 2005/0080702 A1 * | 4/2005 | Modi | 705/36 |
| 2006/0143569 A1 * | 6/2006 | Kinsella et al. | 715/752 |

* cited by examiner

*Primary Examiner* — Tonia L. M. Dollinger
*Assistant Examiner* — Adam Cooney
(74) *Attorney, Agent, or Firm* — Akerman Senterfitt; Michael K. Dixon

(57) ABSTRACT

Methods, systems, and products are disclosed for producing a virtual host. The virtual host is generated. A demographic trait of a user, interacting with the virtual host, is acquired. The virtual host is endowed with the demographic trait, thereby enriching the virtual host to appeal the user.

19 Claims, 20 Drawing Sheets

METHODS, SYSTEMS, AND PRODUCTS FOR PRODUCING PERSONA-BASED HOSTS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Exemplary embodiments generally relate to data processing and to personal agents and, more particularly, to electronic shopping and to customization of operator interfaces.

Virtual hosts can be improved. Computer-generated web hosts, or "virtual" agents, are widely used to help users. A web host, for example, may be used by a merchant's website to help customers find and purchase products and services. Web hosts may also be used by educational software applications to help students understand concepts. Web hosts may even be used in an Interactive Voice Response (IVR) system to help users navigate a menu of options. Web hosts, however, may be improved to appeal to users. If a host appeals to a user, the user may be willing to have longer, and greater, interactions with the host. The virtual host, then, may use that relationship to help increase sales.

SUMMARY

The exemplary embodiments provide methods, systems, and products for producing a web host. This web host is sometimes referred to as a computer-generated or "virtual" agent. A method, for example, generates the virtual host. A demographic trait of a user, interacting with the host, is acquired. The host is endowed with the demographic trait, thereby enriching the host to appeal to the user.

More exemplary embodiments include a system for producing a host. The system comprises means for generating the virtual host. Means are also included for acquiring a demographic trait of a user interacting with the host. Means are also included for endowing the host with the demographic trait, thereby enriching the host to appeal to the user.

Other exemplary embodiments describe a computer program product for producing a web host. The host is generated. A demographic trait of a user, interacting with the host, is acquired. The host is endowed with the demographic trait, thereby enriching the host to appeal to the user.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
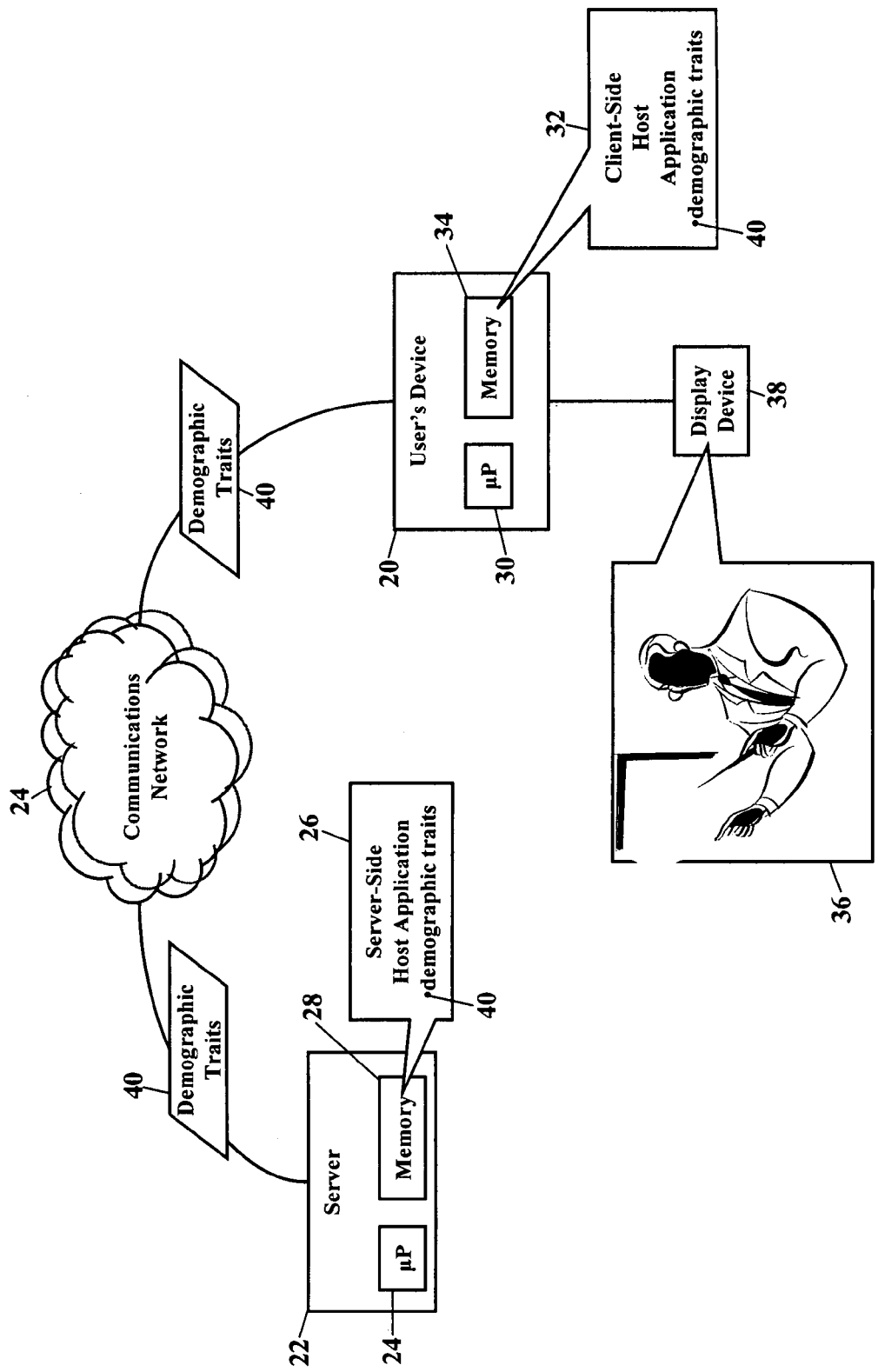
FIG. 1 is a schematic illustrating an operating environment in which exemplary embodiments may be implemented.

FIG. 1 is a schematic illustrating an environment in which exemplary embodiments may be implemented. A user's device 20 communicates with a server 22 via a communications network 24. Although the user's device 20 is generically shown, the device 20, as will be later explained, may be a computer, a radio, a personal digital assistant (PDA), a cordless/cellular/IP phone, digital music player, or any other device. The server 22 has a processor 24 (e.g., "µP"), application specific integrated circuit (ASIC), or other device that executes a server-side host application 26 stored in a memory 28. The user's device 20 may also have a processor 30 (e.g., "µP"), application specific integrated circuit (ASIC), or other device that executes a client-side host application 32 stored in memory 34. The server-side host application 26 and/or the client-side host application 32 may cooperate to cause the user's device 20 to generate a virtual host 36. The virtual host 36 is illustrated as being visually produced on a display device 38, yet the virtual host 36 may also have audible features.

The virtual host 36 may assume the user's persona. According to exemplary embodiments, the server-side host application 26 and/or the client-side host application 32 are sets of processor-executable instructions that tailor the web host 36 to the user's demographics. As the user interacts with the host 36, the server-side host application 26 and/or the client-side host application 32 acquires one or more demographic traits 40 associated with the user. The demographic traits 40 may be based on actual data collection from the user's device 20. The demographic traits 40, however, may be inferred with little or no data collected from the user's device 20. When the demographic traits 40 are obtained, the demographic traits 40 may be shared between the server-side host application 26 and the client-side host application 32. The server-side host application 26 and/or the client-side host application 32 may then cooperate to endow the virtual host 36 with one, some, or all of the demographic traits 40 associated with the user. The host 36 is thus enriched with the demographic traits 40 that appeal to, and/or that match, the user.

At any time, though, the user may configure the host 36. The user may prefer to override or self-select the host's characteristics. The user, for example, may access a menu of host characteristics. This menu may provide options for selecting or modifying the host's physical appearance, personality, sense of humor, and any other traits. The user, for example, may select the host's sex (male or female), ethnicity, hair color, eye color, and speech accent e.g. French or Midwestern). The user may select the host's personality (e.g., helpful, aggressive, or nurturing). The user may also modify the host's sense of humor. The user may be presented with levels of humor, and the user may choose the level that best suits the user. A "0" level, for example, may endow the host 36 with a dry sense of humor, while level "10" endows the host with a joking sense of humor (corporate users, as an example, may prefer that the host be endowed with company-appropriate humor). The user may select the host's clothing, hair style, and even jewelry, even selecting famous or niche designers' offerings. The user may even select attributes that include a cane, walker, wheelchair, crutches, sign language abilities, and other personalizing characteristics. When the user has reduced or limited visual ability, for example, selection of the host's pronunciation and other voice traits may be important. The user, in short, may be presented with a full menu of host characteristics, thus enabling the user to configure the host 36 as desired.

The host 36 may thus assume the user's desired personality and/or traits. The virtual host 36 may be associated with an electronic commerce website, a help application, a tutor or educational application, or any other environment where a processor-generated host or agent assists the user. Because the host 36 may adopt the demographic traits 40 associated with the user, the virtual host 36 may assume characteristics that match the user's personality and/or that appeal to the user. An e-commerce website, for example, may tailor the host 36 to increase sales. Because the virtual host 36 may adopt the user's demographic traits 40, the host 36 may appeal to the user and, thus, exploit that relationship to drive sales. The longer the user interacts with the host 36, the more demographic traits 40 that may be acquired. The host 36 may thus continually evolve to "mirror" the user's personality.

Some aspects of computer-generated or virtual hosts are known, so this disclosure will not greatly explain the known details. If the reader desires more details, the reader is invited to consult the following sources: U.S. Pat. No. 5,309,355 to Lockwood; U.S. Pat. No. 6,032,129 to Greef, et al.; U.S. Pat. No. 6,035,283 to Rofrano; U.S. Pat. No. 6,088,731 to Kiraly, et al.; U.S. Pat. No. 6,735,632 to Kiraly, et al.; U.S. Pat. No. 6,868,392 to Ogasawara; U.S. Pat. No. 6,904,408 to McCarthy, et al.; U.S. Pat. No. 7,184,540 to Dezonno, et al.; U.S. Patent Application Publication 2001/0032140 to Hoffman; and U.S. Patent Application Publication 2003/0028498 to Hayes-Roth.

The user's device 20 and the server 22 are only simply illustrated. Because the architecture and operating principles of these devices are well known, their hardware and software components are not further shown and described. If the reader desires more details, the reader is invited to consult the following sources: ANDREW TANENBAUM, COMPUTER NETWORKS($4^{th}$ edition 2003); WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004).

Exemplary embodiments may be applied regardless of networking environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The communications network 24 may even include powerline portions, in which signals are communicated via electrical wiring. The concepts described herein may be applied to any wireless/wireline communications network, regardless of physical componentry, physical configuration, or communications standard(s).

Figure 2:
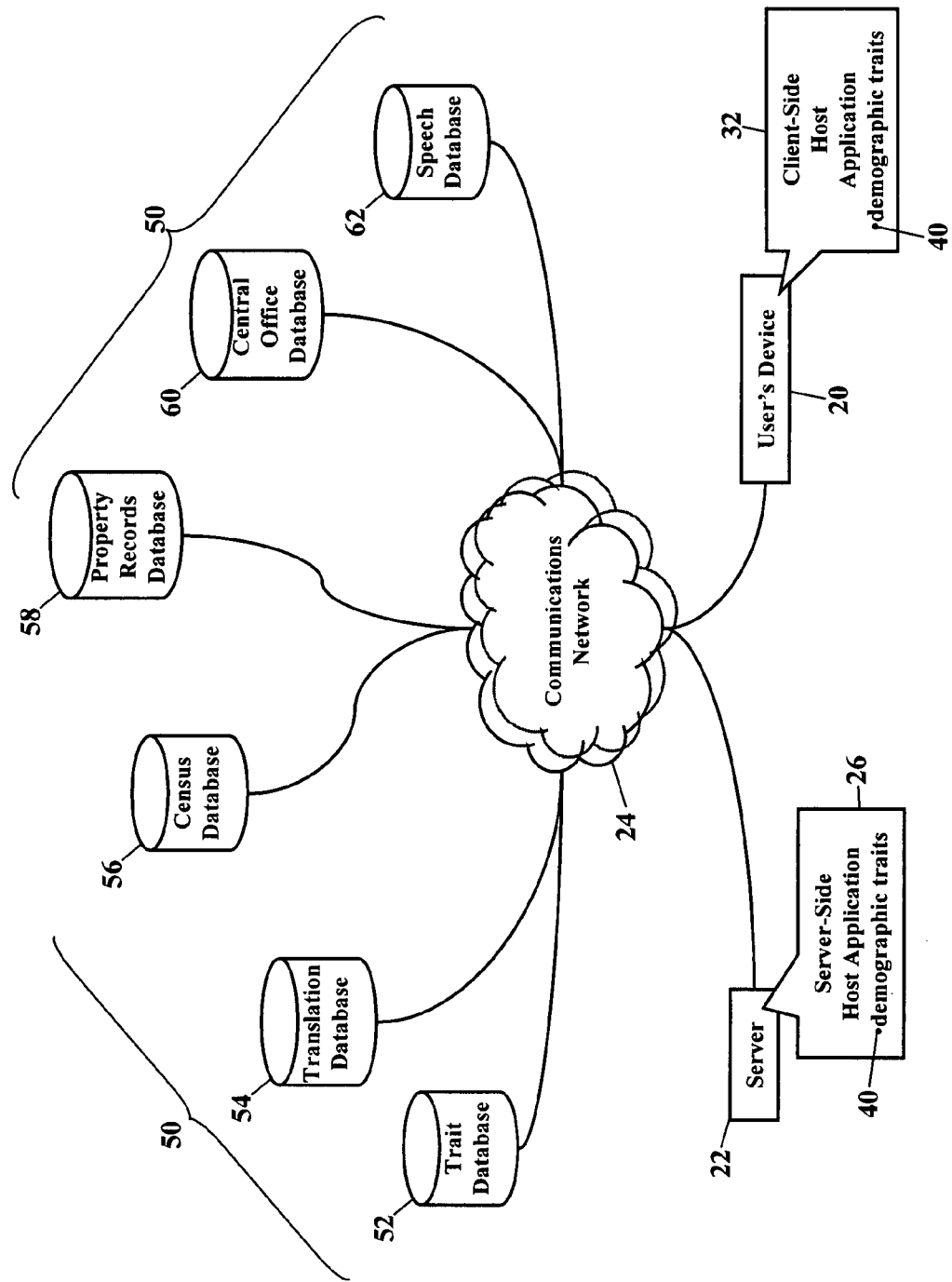
FIG. 2 is a schematic illustrating another environment in which exemplary embodiments may be implemented.

FIG. 2 is a schematic illustrating another environment in which exemplary embodiments may be implemented. Here the user's device 20, and/or the server 22, may access one or more databases 50 to acquire, obtain, or even infer the demographic traits 40. That is, the server-side host application 26 and/or the client-side host application 32 may query any of the databases 50 for information that helps tailor the host 36 to the user. The various databases 50 are illustrated as being remotely located from the user's device 20 and from the server 22. That is, the user's device 20 and/or the server 22 may query the databases 50 (via the communications network 24) to obtain information. The various databases 50, however, may be locally stored in the user's device 20 and/or in the server 22. A trait database 52, for example, stores relationships between to demographic traits. A translation database 54 may provide translation services between Internet Protocol addresses, physical addresses, telephone numbers, email addresses, and/or any other communications addresses. A census database 56 stores census data, while a property records database 58 stores property records. A central office database 60 stores information describing central offices, while a speech database 62 stores accents and/or dialects that may be applied to the host 36. As the following paragraphs explain, the server-side host application 26 and/or the client-side host application 32 may query any of the databases 50 for information that helps tailor the host 36 to the user.

Figure 3:
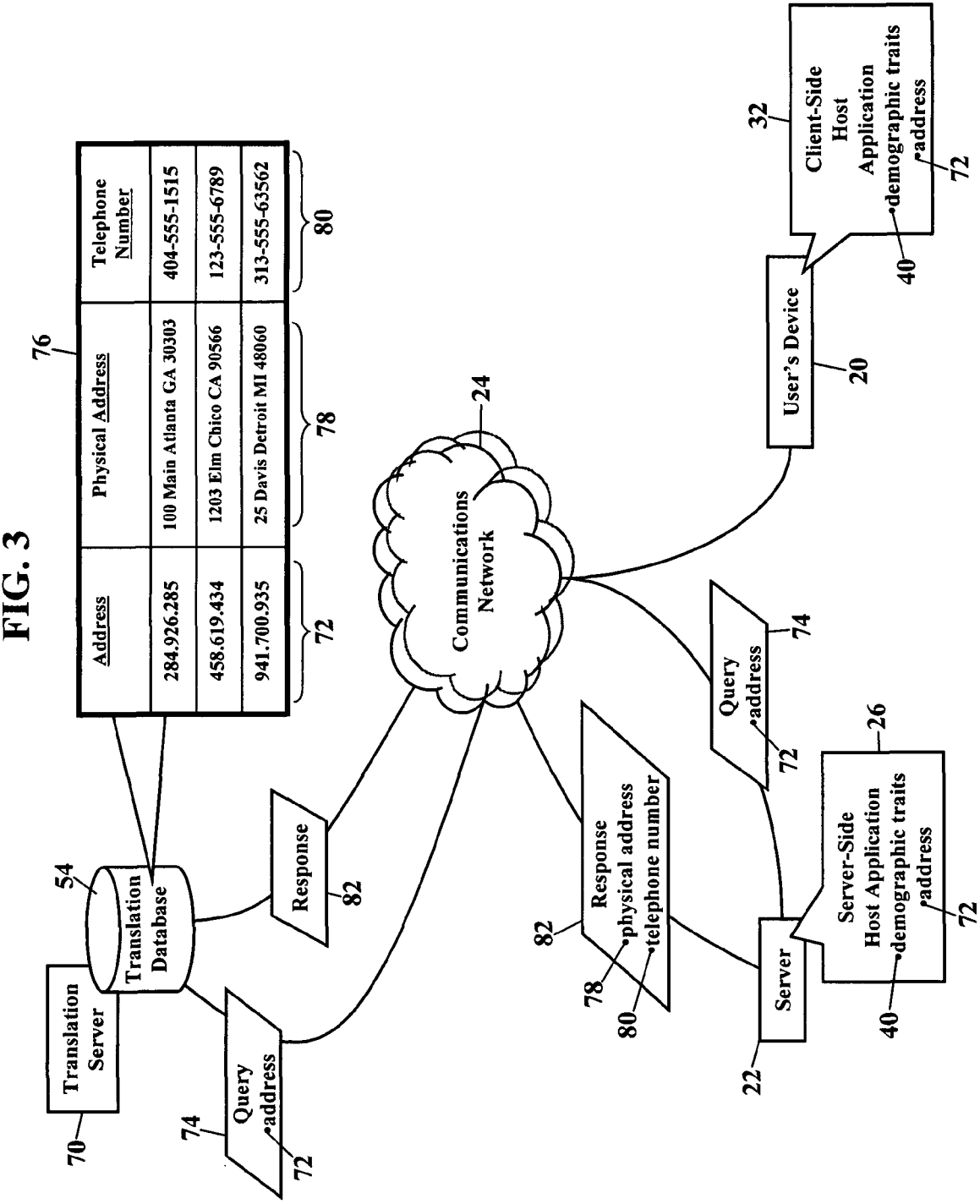
FIG. 3 is a schematic illustrating the translation database, according to exemplary embodiments.

FIG. 3 is a schematic illustrating the translation database 54, according to exemplary embodiments. The translation database 54 provides translation services between Internet Protocol addresses, physical addresses, telephone numbers, email addresses, and/or any other communications addresses, according to exemplary embodiments. Here the translation database 54 is illustrated as being remotely stored in a translation server 70, yet the translation database 54 may be locally stored in the user's device 20 and/or in the server 22. As the server-side host application 26 and/or the client-side host application 32 interact with the user's device 20, either application may obtain an address 72 associated with the user's device 20. The address 72, for example, may be a static or dynamic Internet Protocol address assigned to the user's device 20. The address 72, however, may also be an email address, pager address, or any other communications address. The translation database 54 may then be queried for the address 72. FIG. 3, for simplicity, illustrates a query 74 communicating from the server 22 to the translation database 54. The query 74, however, may additionally or alternatively communicate from the user's device 20. The query 74 may include information representing the address 72.

The translation database 54 may then translate the address 72. The translation database 54 is illustrated as a table 76 that maps, relates, or otherwise associates the address 72 to a physical address 78 and/or to a telephone number 80. The translation database 54 then sends a query response 82, and the query response 82 includes the telephone number 80 and/or the physical address 78 associated with the address 72. Suppose, for example, that the translation database 54 is queried for an Internet Protocol address assigned to the user's device 20. The translation database 54 may then retrieve and return the physical address 78 associated with the address 72. The physical address 78, for example, may be a postal mailing address or Global Positioning System coordinates that finely or accurately describe a physical location associated with the address 72 (and perhaps with the user). The physical address 78, however, may be a more general description of location, such as a United States Postal Service "Zone Improvement Plan" (or "ZIP") code. Other more general descriptions of location may include a city or metropolitan area, county, state, or even region. The translation database 54, in general, stores any information that may be associated with the address 72.

Figure 4:
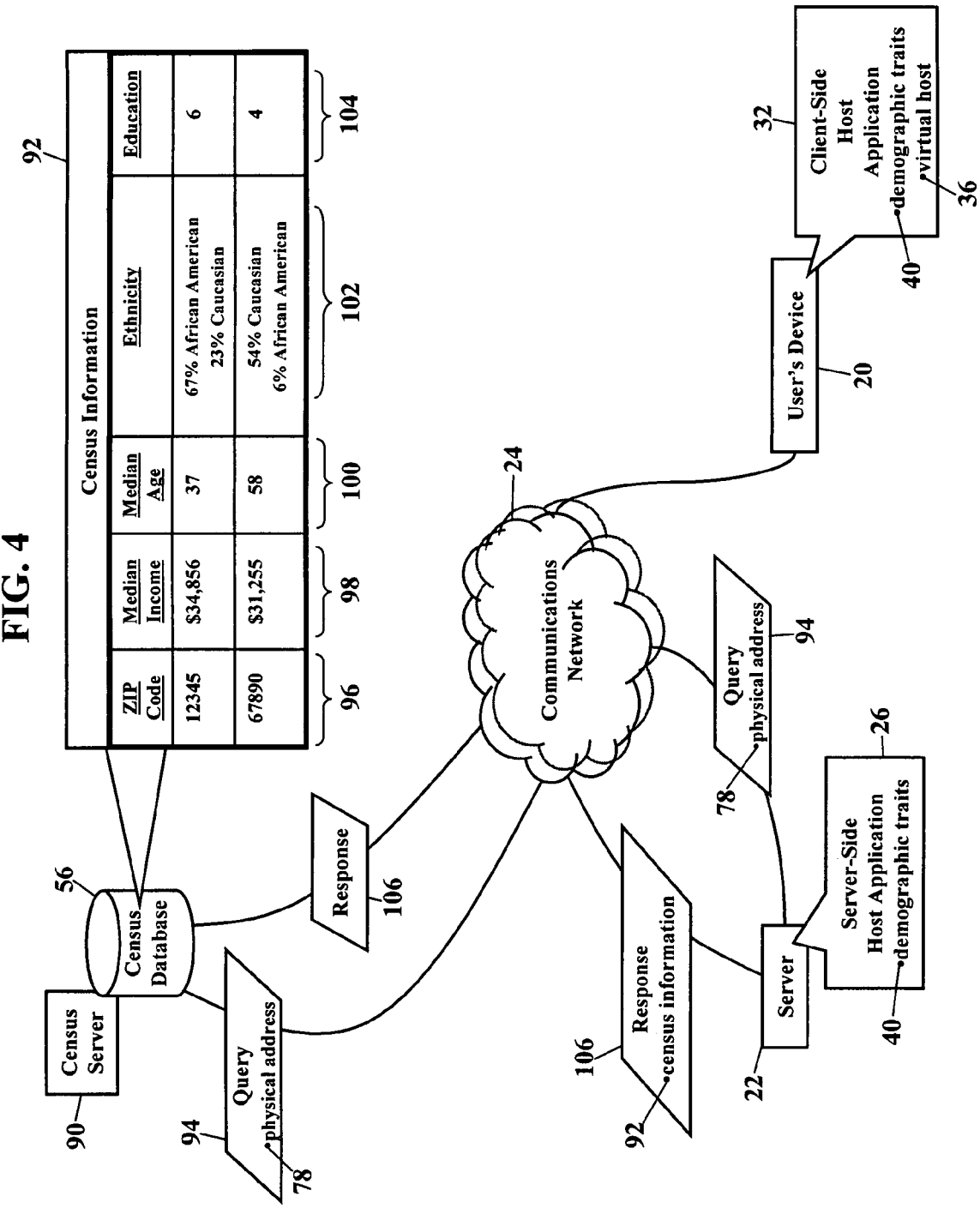
FIG. 4 is a schematic illustrating a census database, according to more exemplary embodiments.

FIG. 4 is a schematic illustrating the census database 56, according to more exemplary embodiments. The census database 56 is illustrated as being remotely stored in a census server 90, yet the census database 56 may be locally stored in the user's device 20 and/or in the server 22. According to exemplary embodiments, the census database 56 stores census information 92 that may or may not be derived from governmental private surveys, questionnaires, interviews, and other techniques. Once the physical address 78 is acquired (as explained with reference to FIG. 3), the server-side host application 26 and/or the client-side host application 32 may then query the census database 56. FIG. 4, for simplicity, illustrates a query 94 communicating from the server 22 to the census database 56. The query 94 includes information representing the physical address 78 (obtained from the translation database 54, as explained with reference to FIG. 3.) The census database 56 maps, relates, or otherwise associates the physical address 78 to the census information 92. The census database 56 looks up and retrieves the census information 92 associated with the physical address 78.

The census information 92 may describe the demographic traits associated with the physical address 78. Suppose, for example, that the physical address 78 is described by a postal ZIP code 96. When the server-side host application 26 and/or the client-side host application 32 queries for the ZIP code 96, the census database 56 retrieves the census information 92 associated with the ZIP code 96. The census information 92, for example, may describe a median or average income 98, media age 100, ethnicity 102, years of education 104, and any other demographic information associated with the ZIP code 96. According to exemplary embodiments, the census database 56 then sends a query response 106, and the query response 106 includes the census information 92. The query response 106 communicates to the server 22.

The server-side host application 26 receives the query response 106. The server-side host application 26 and the client-side host application 32 may then cooperate to endow the host 36 with the demographic traits 40 associated with the census information 92. That is, the server-side host application 26 and/or the client-side host application 32 may alter the visual appearance and/or speech of the host 36, according to the census information 92. When, for example, the median age 100 is young, the host 36 may assume, transition, or morph to a youthful appearance, attitude, speech, gestures, and other demographic traits 40 associated with the median age 100. When the median age 100 is older, though, the host 36 may assume a more mature appearance with corresponding speech, mannerisms, and other demographic traits 40. When the census information 92 indicates a predominate ethnicity associated with the ZIP code 96, the host 36 may assume that ethnicity. When the census information 92 indicates a highly educated populace, the host 36 may assume a vocabulary and other demographic traits 40 more suited to the educational level of the populace. The host 36, in short, is endowed with any demographic traits 40 matching, or associated with, the census information 92, according to exemplary embodiments.

Figure 5:
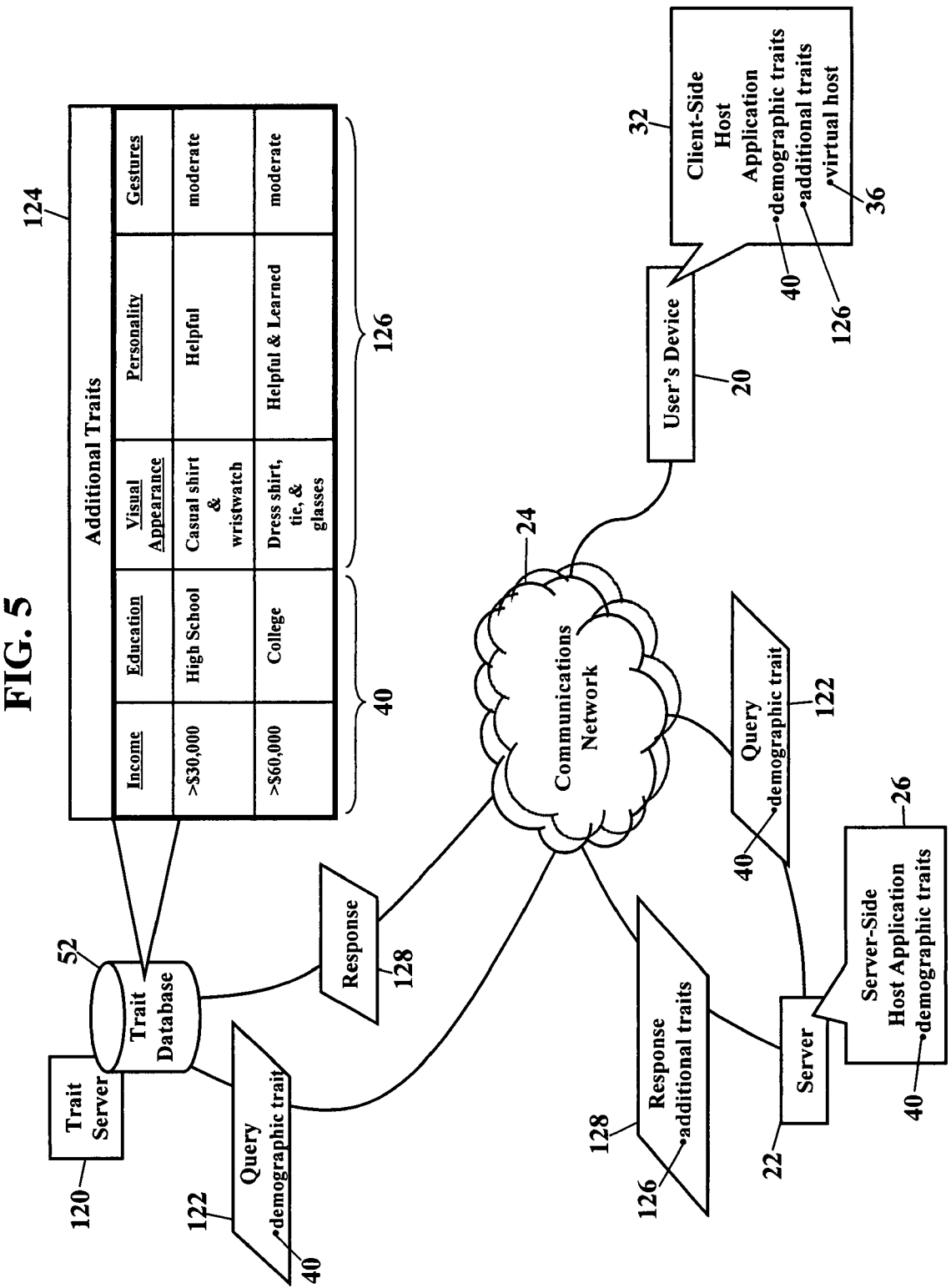
FIG. 5 is a schematic illustrating a trait database, according to more exemplary embodiments.

FIG. 5 is a schematic illustrating the trait database 52, according to more exemplary embodiments. The trait database 52 is illustrated as being remotely stored in a trait server 120, yet the trait database 52 may be locally stored in the user's device 20 and/or in the server 22. The trait database 52 stores demographic relationships amongst traits, according to exemplary embodiments. When one or more of the demographic traits 40 are obtained, the trait database 52 may be used to obtain even more demographic traits 40. The server-side host application 26, for example, sends a query 122 to the trait database 52, and the query 122 includes information representing any demographic trait 40 (such as the median age 100 obtained from the census database 56, as illustrated in FIG. 4). The trait database 52 is illustrated as a table 124 that maps, relates, or otherwise associates the demographic trait 40 to additional demographic traits 126. The trait database 52 then looks up and retrieves the additional demographic traits 126 that are associated with the demographic trait 40. The trait database 52 then sends a query response 128, and the query response 128 includes information representing the additional demographic traits 126. The server-side host application 26 and the client-side host application 32 may then cooperate to endow the host 36 with the additional demographic traits 126, thereby further enhancing the host 36 to appeal to the user.

An example helps illustrate the trait database 52. Suppose the server-side host application 26 obtains the census information associated with the user's physical address (the census information and the user's physical address are, respectively, illustrated as reference numerals 92 and 78 in FIG. 4). Suppose also that the census information 92 describes a high median income and an educated populace. The server-side host application 26 may then query the trait database 52 for the additional demographic traits 126 associated with high income and highly educated users. The trait database 52 responds with the additional demographic traits 126. The trait database 52, for example, may store clothing, jewelry, and even eyewear options or parameters associated with high income and highly educated users. The server-side host application 26 and the client-side host application 32 may then cooperate to customize the host 36 with clothing and jewelry that appeals to a high income, highly educated user. When the census information 92 describes a young median age for the populace, the trait database 52 may retrieve clothing parameters that are appropriate for a younger appearance (such as matching the median age). The trait database 52 may even store and associate broad and/or fine characteristics for the host 36, such as eyes (e.g., color), hair (e.g., texture, color, and length), skin tones, attitude, and mannerisms (e.g., regional differences). The trait database 52 may thus be used to obtain parameters that endow the host 36 with characteristics that demographically match, resemble, or appeal to the user.

Figure 6:
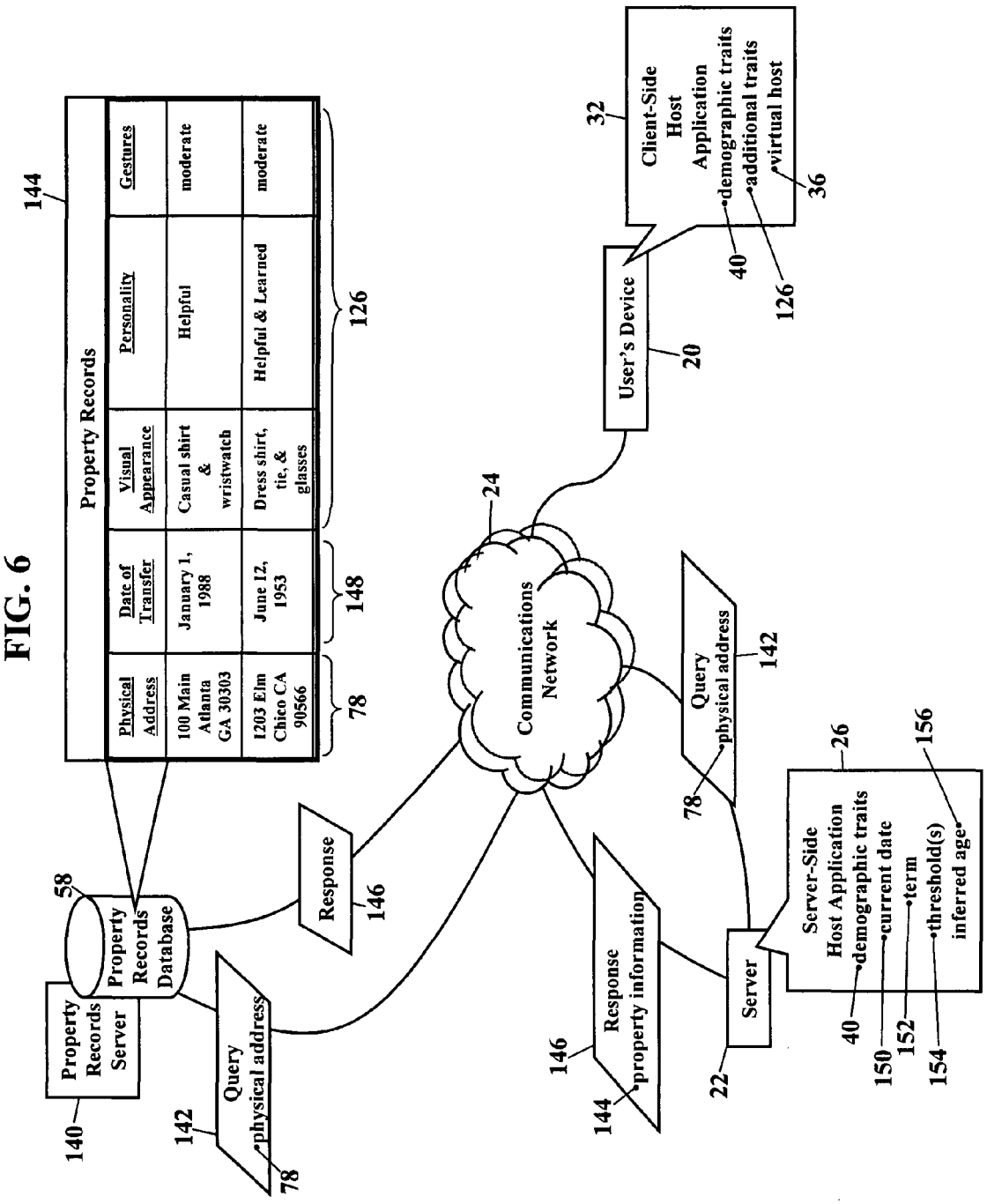
FIGS. 6 and 7 are schematics illustrating a property records database, according to more exemplary embodiments.

FIG. 6 is a schematic illustrating the property records database 58, according to more exemplary embodiments. The property records database 58 is illustrated as being remotely stored in a property records server 140, yet the property records database 58 may be locally stored in the user's device 20 and/or in the server 22. According to exemplary embodiments, the property records database 58 stores electronic property records (such as information describing deeds, mortgages, taxes, easements, and any other property records). When the physical address 78 is acquired from the translation database (illustrated as reference numeral 54 in FIG. 3), the server-side host application 26 (and/or the client-side host application 32) may then query the property records database 58. The server-side host application 26, for example, sends a query 142 to the property records database 58, and the query 142 includes information representing the physical address 78. The property records database 58 retrieves property information 144 associated with the physical address 78. The property records database 58 then sends a query response 146, and the query response 146 includes the property information 144. When the server-side host application 26 (and/or the client-side host application 32) receives the query response 146, the property information 144 is used to endow the host 36 with the demographic traits 40.

The property records database 58, for example, may be used to infer the demographic traits 40 associated with the user. When the property information 144 is received, the property information 144 may be inspected for a date 148 of transfer. The date 148 of transfer may represent a date at which the property (represented by the physical address) came under the ownership, lease, rent, or contract of the user. Exemplary embodiments may use the date 148 of transfer to infer an age 156 of the user.

Suppose, for example, that the server-side host application 26 compares the date 148 of transfer to a current date 150. The server-side host application 26 may calculate a term 152 of ownership or occupancy by calculating or determining a length of time (in years, months, days, or hours) between the current date 150 and the date 148 of transfer. The term 152 of ownership or occupancy may then be compared to various threshold values 154 to infer or estimate the user's age 156. When, for example, the term 152 of ownership or occupancy equals or exceeds a high/large threshold value (perhaps forty years), then the server-side host application 26 may assume that the user has attained an elderly age. A small/low threshold value (less than 2 years) may indicate a young or first time home owner. When neither the high or low thresholds are satisfied, then the server-side host application 26 may assume that the user is at least middle age (e.g., at least ten years of ownership or occupancy). The host 36 may then be endowed with demographic traits 40 that match or appeal to the inferred age 156.

Figure 7:
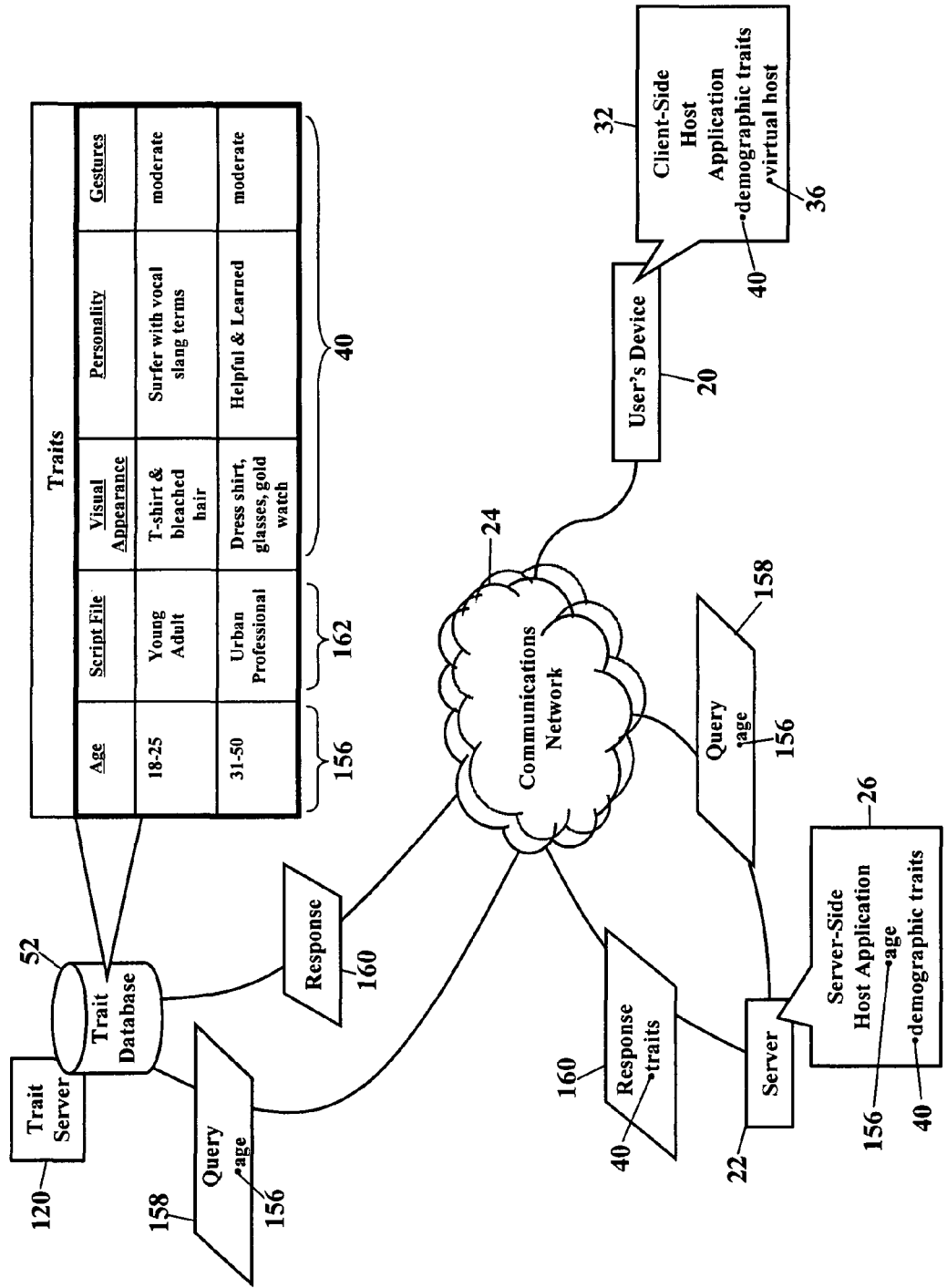

FIG. 7 is another schematic that further illustrates the trait database 52, according to more exemplary embodiments. Once the age 156 of the user is inferred (perhaps from the years of ownership or occupancy), the trait database 52 may be queried for the inferred age 156. The server-side host application 26, for example, sends a query 158 to the trait database 52, and the query 158 includes information representing the age 156. The trait database 52 retrieves the demographic traits 40 associated with the age 156. The trait database 52 then sends a query response 160, and the query response 160 includes the demographic traits 40. The trait database 52, for example, may store clothing, hair color, jewelry, and eyewear parameters for the host 36. The trait database 52 may even store mannerisms, attitude, and other personality characteristics that are desirable for the inferred age 156. The trait database 52 may even store different scripts 162 of questions, according to the inferred age 156. The trait database 52 may thus again be used to obtain parameters that endow the host 36 with characteristics that demographically match, resemble, or appeal to the user.

Figure 8:
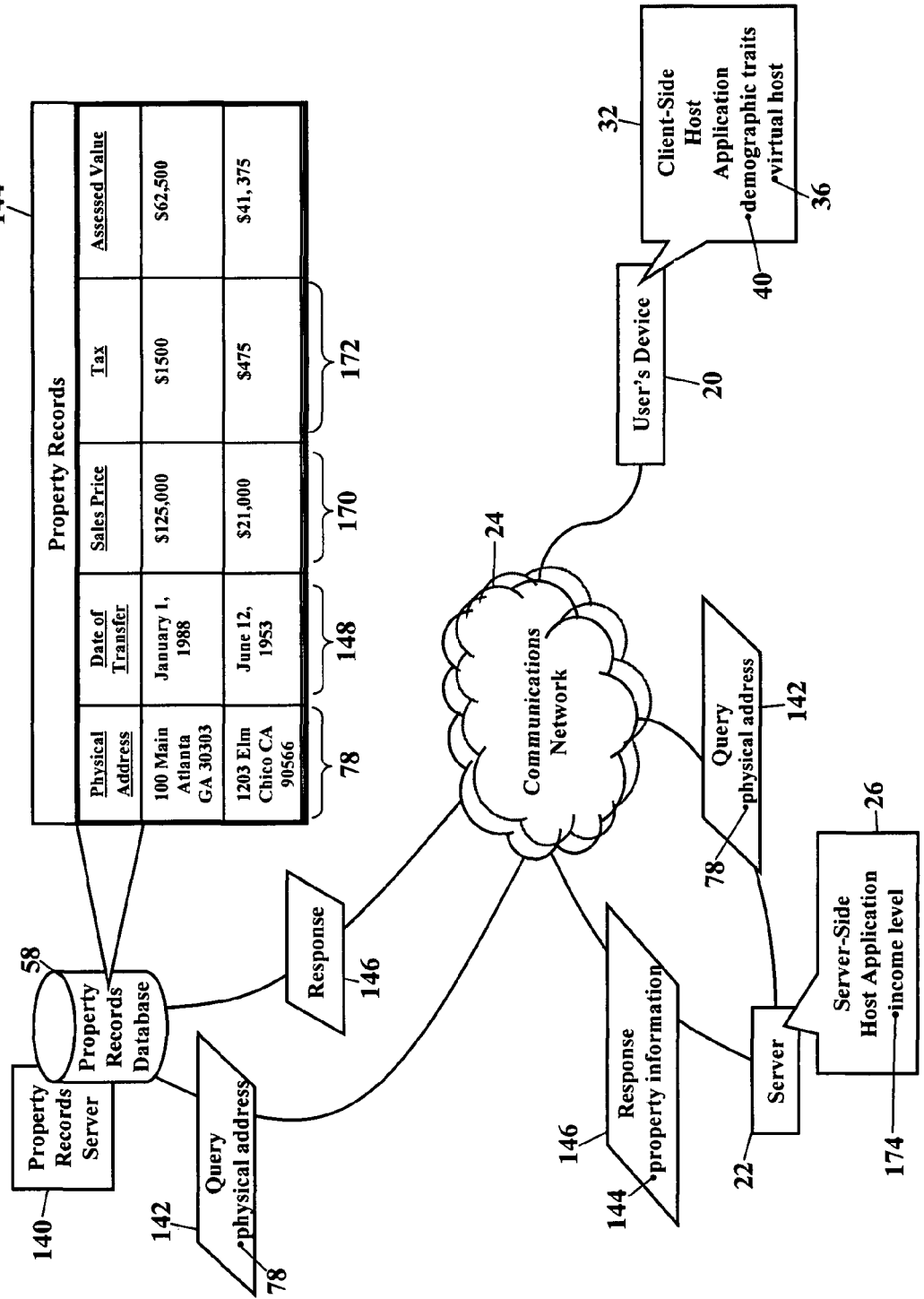
FIGS. 8 and 9 are schematics illustrating illustrates how the user's income may be inferred, according to more exemplary embodiments.
Figure 9:
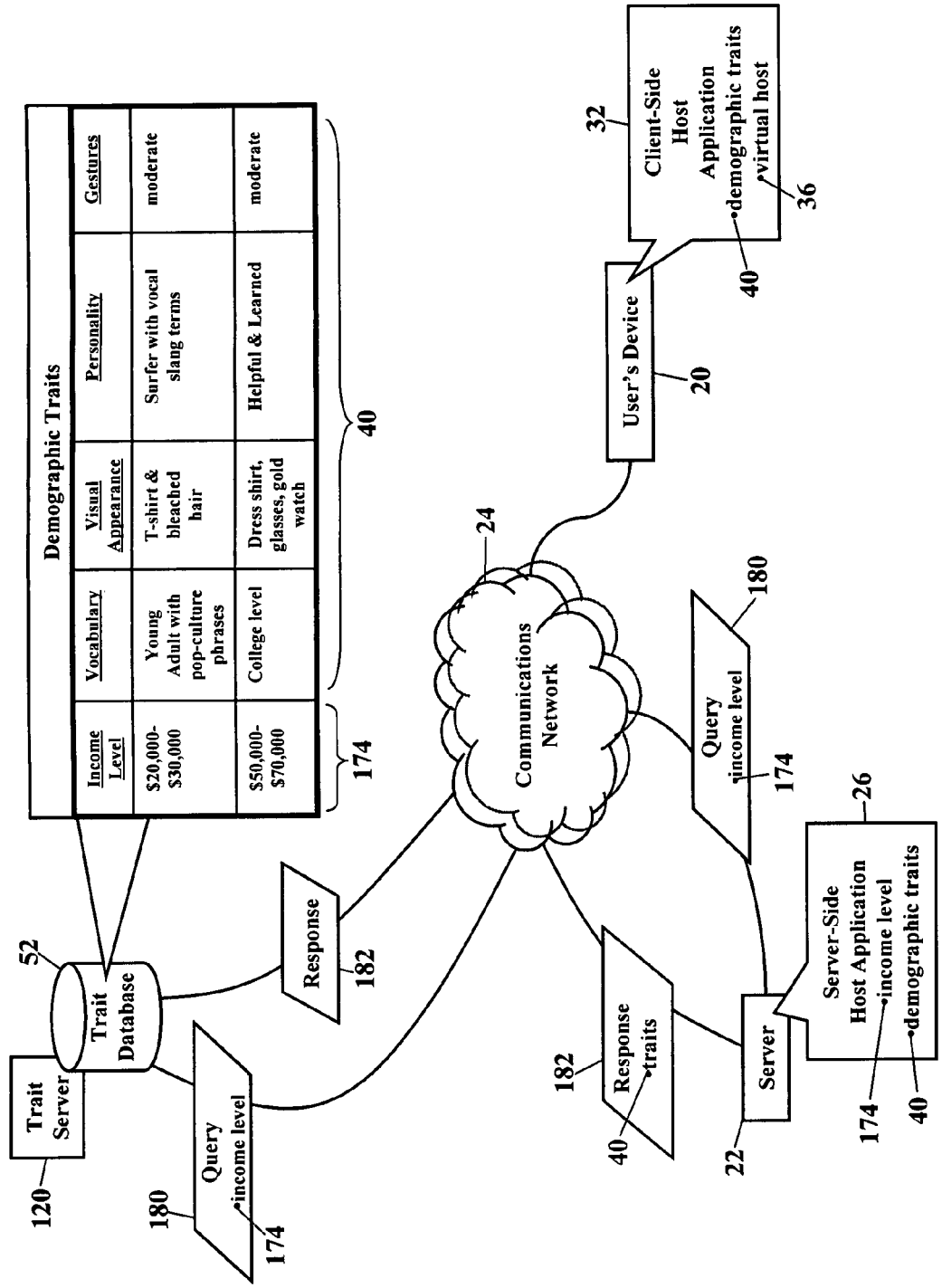

FIGS. 8 and 9 are schematics illustrating how the user's income may be inferred, according to more exemplary embodiments. When the property records database 58 is queried for the physical address 78, the property records database 58 retrieves and responds with the property information 144 associated with the physical address 78. When the server-side host application 26 (and/or the client-side host application 32) receives the query response 146, the property information 144 may be inspected for a sales price 170 and/or property tax information 172. The sales price 170 may represent a purchase price, lease/rent price, and/or contract price associated with the property (represented by the physical address 78). Exemplary embodiments may use the sales price 170 and/or the property tax information 172 to infer an income level 174 of the user. Many lenders, for example, limit home mortgage payments to a maximum percentage of a buyer's monthly income (many lenders impose a maximum monthly payment of twenty eight percent (28%) of a buyer's monthly income). The sales price 170 and/or the property tax information 172, then, may used to infer the income level 174 of the user.

As FIG. 9 illustrates, the host 36 may then be endowed with the demographic traits 40 associated with the inferred income level 174. Once the user's income level 174 is inferred, the trait database 52 may be queried for the inferred income level 174. The trait database 52 then responds with the demographic traits 40 that are associated with the inferred income level 174. The server-side host application 26, for example, sends a query 180 to the trait database 52, and the query 180 includes information representing the inferred income level 174. The trait database 52 retrieves the demographic traits 40 associated with the inferred income level 174. The trait database 52 then sends a query response 182, and the query response 182 includes the demographic traits 40. The trait database 52, for example, may store clothing, hair color, jewelry, and eyewear parameters for the host 36. The trait database 52 may even store mannerisms, attitude, and other personality characteristics that are desirable for the inferred income level 174. The trait database 52 may store scripts, questions, and even vocabularies that are demographically matched to the inferred income level 174. The trait database 52 may thus again be used to obtain parameters that endow the host 36 with characteristics that demographically match, resemble, or appeal to the user.

Figure 10:
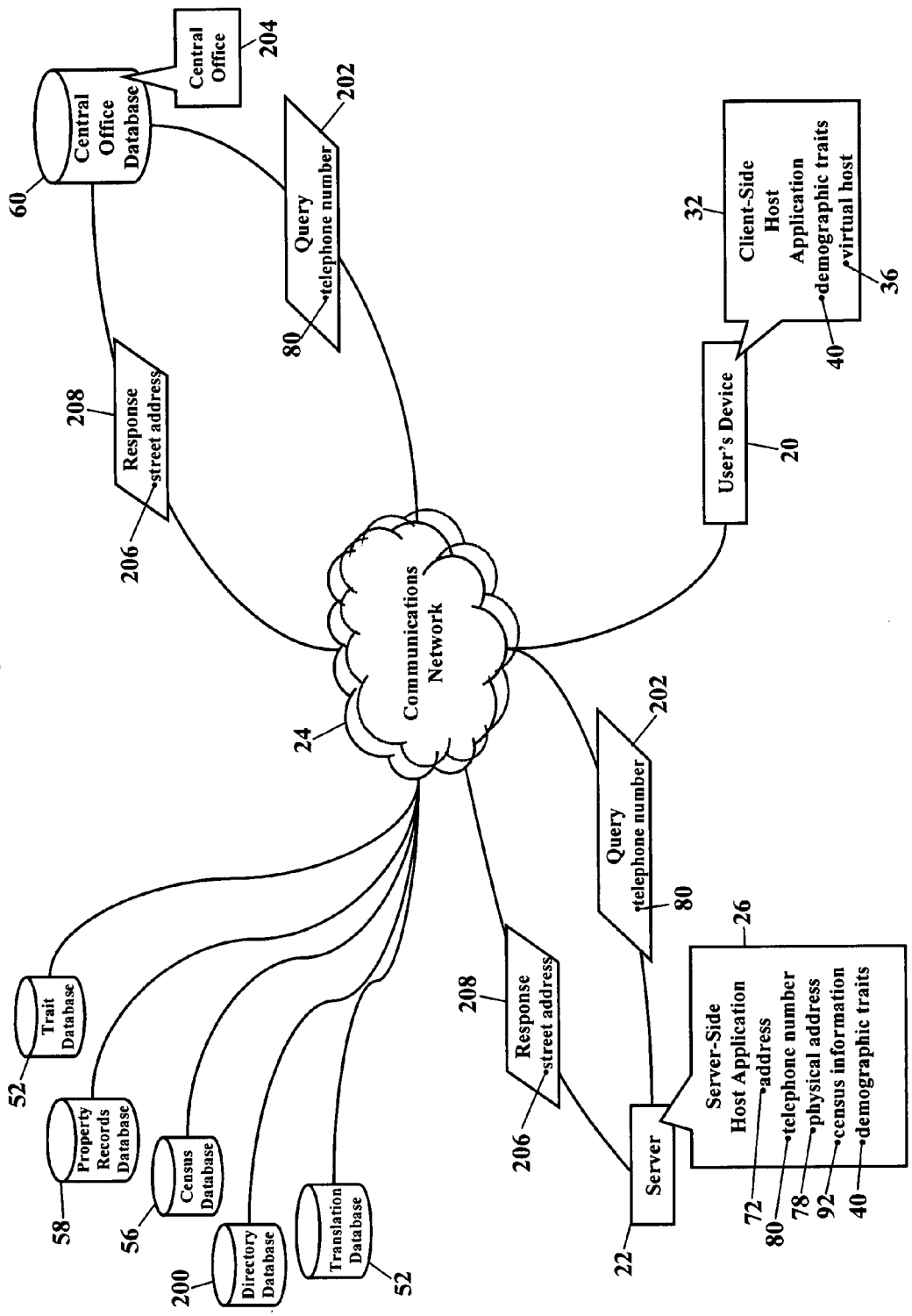
FIG. 10 is a schematic illustrating database queries to estimate the user's location, according to even more exemplary embodiments.

FIG. 10 is a schematic illustrating database queries to estimate the user's location, according to even more exemplary embodiments. As the above paragraphs explained, when the server-side host application 26 and/or the client-side host application 32 interact with the user's device 20, either or both applications 26 and 32 may obtain the address 72 (such as an Internet Protocol address) associated with the user's device 20 (see, e.g., the paragraphs accompanying FIG. 3). As the above paragraphs also explained, the server-side host application 26 (and/or the client-side host application 32) may query the translation database 54 for the telephone number 80 associated with the address 72. The translation database 54, for example, may be operated by or on behalf of an Internet Service Provider, website provider, or email provider. These providers may have information that relates Internet Protocol addresses to telephone numbers.

Now that the telephone number 80 is known, the physical address 78 may be obtained. A "white pages" directory database 200, for example, may then be queried for a street, mailing, or other physical address 78 associated with the telephone number 80. The "white pages" directory database 200, however, is well known to those of ordinary skill in the art and not further explained. Once the physical address 78 is known, the census database 56, the property records database 58, and/or the trait database 52 may be queried to obtain the census information 92 and/or the demographic traits 40 that enhance the host 36 (as explained with reference to FIGS. 4-9).

Sometimes, however, the physical address 78 is not discoverable. Even if the telephone number 80 is translated (by the translation database 54), the physical address 78 associated with the telephone number 80 may not be obtainable. When, for example, the telephone number 80 is unlisted, the "white pages" directory database 200 may not include an entry for the telephone number 80. The telephone number 80 may also be recently assigned, and the "white pages" directory database 200 may not reflect recently-assigned numbers. Whatever the reasons, the physical address 78 associated with the telephone number 80 may not be obtainable.

Exemplary embodiments, however, may infer location from the telephone number 80. Once the telephone number 80 is obtained, the server-side host application 26 (and/or the client-side host application 32) may query the central office database 60. The central office database 60 stores physical location information for central offices that serve or provide services to telephone numbers. The server-side host application 26, for example, may send a query 202 to the central office database 60. The query 202 includes information representing some or all of the telephone number 80. The query 202, for example, may comprise a number exchange, or "NXX" portion, of the telephone number 80. The central office database 60 looks up a central office 204 that is associated with the telephone number 80. The central office database 60 also looks up and retrieves a street address 206 of the associated central office 204. That is, the central office database 60 may retrieve the street address 206 of the central office 204 serving the telephone number 80. Because many central office facilities are within a few miles (or less) of a customer's premises, the street address 206 associated with the serving central office 204 may be used as a surrogate value for the physical address 78.

The street address 206 is then used to endow the host 36 with the demographic traits 40. The central office database 60 sends a query response 208, and the query response 208 includes the street address 206. The server-side host application 26 (and/or the client-side host application 32) may query the census database 56 for the census information 92 associated with the street address 206 of the central office 204 (as explained with reference to FIG. 4). The server-side host application 26 (and/or the client-side host application 32) may also query the trait database 52 for the demographic traits 40 that are associated with the census information 92 and/or with the street address 206 (as explained with reference to FIGS. 4-9). The host 36 may thus be endowed with characteristics that demographically match, resemble, or appeal to the user, based on the street address 206 of the serving central office 204.

Location may also be obtained or inferred for wireless users. As wireless environments proliferate, users are increasingly using wireless access to the communications network 24. Exemplary embodiments, then, may be applied to wireless environments to obtain, or to infer, a physical location for a mobile user. The user's device 20, for example, may include or access a Global Positioning System to report current location information or coordinates. Exemplary embodiments may additionally or alternatively use a physical address associated with a wireless router or other access point. However a location is obtained, the location may be used to infer the demographic traits 40 associated with that location. Once the location is known, the census database 56, the property records database 58, and/or the trait database 52 may be queried to obtain the census information 92 and/or the demographic traits 40 that enhance the host 36 (as explained with reference to FIGS. 4-9). When, for example, the mobile user's location indicates a college campus or building, exemplary embodiments may assume the user is of college age. The host 36 may then be endowed with the demographic traits 40 that are appropriate for college students. When the mobile user's location indicates a museum, perhaps the host 36 may be endowed with the demographic traits 40 that appeal to museum lovers. If the location indicates an airport, perhaps the host 36 may be endowed with the demographic traits 40 that appeal to travel lovers. These location-based assumptions, of course, may not accurately reflect the mobile user's actual traits. As the mobile user interacts with the host 36, however, exemplary embodiments may continue to refine the demographic traits 40 to appeal to the user.

Additional schemes may be used to obtain, or infer, a mobile user's location. A static or dynamic Internet Protocol address, for example, may be used to obtain the user's physical location 78. As those of ordinary skill in the art understand, an Internet Protocol address associated with the user's device 20 may be static or dynamic. A static Internet Protocol address may infrequently, or never, change. A dynamic Internet Protocol address may sometimes, periodically, or frequently change, for many reasons. Regardless, exemplary embodiments may obtain or infer location from the user's Internet Protocol address. Many Internet Service Providers maintain detailed subscriber and/or billing records that may be used to obtain the demographic traits 40. The server-side host application 26 (and/or the client-side host application 32) may query an Internet Service Provider for an address or telephone number associated with the user's static or dynamic Internet Protocol address. If the Internet Service Provider responds with an address, that address may be used to query the census database 56, the property records database 58, and/or the trait database 52 (as explained with reference to FIGS. 4-9). If the Internet Service Provider responds with a telephone number, exemplary embodiments may query the "white pages" directory database 200 and/or the central office database 60 (as above explained). Again, once an address is known, the host 36 may be endowed with characteristics that demographically match, resemble, or appeal to the user, based on the address associated with the mobile user.

Figure 11:
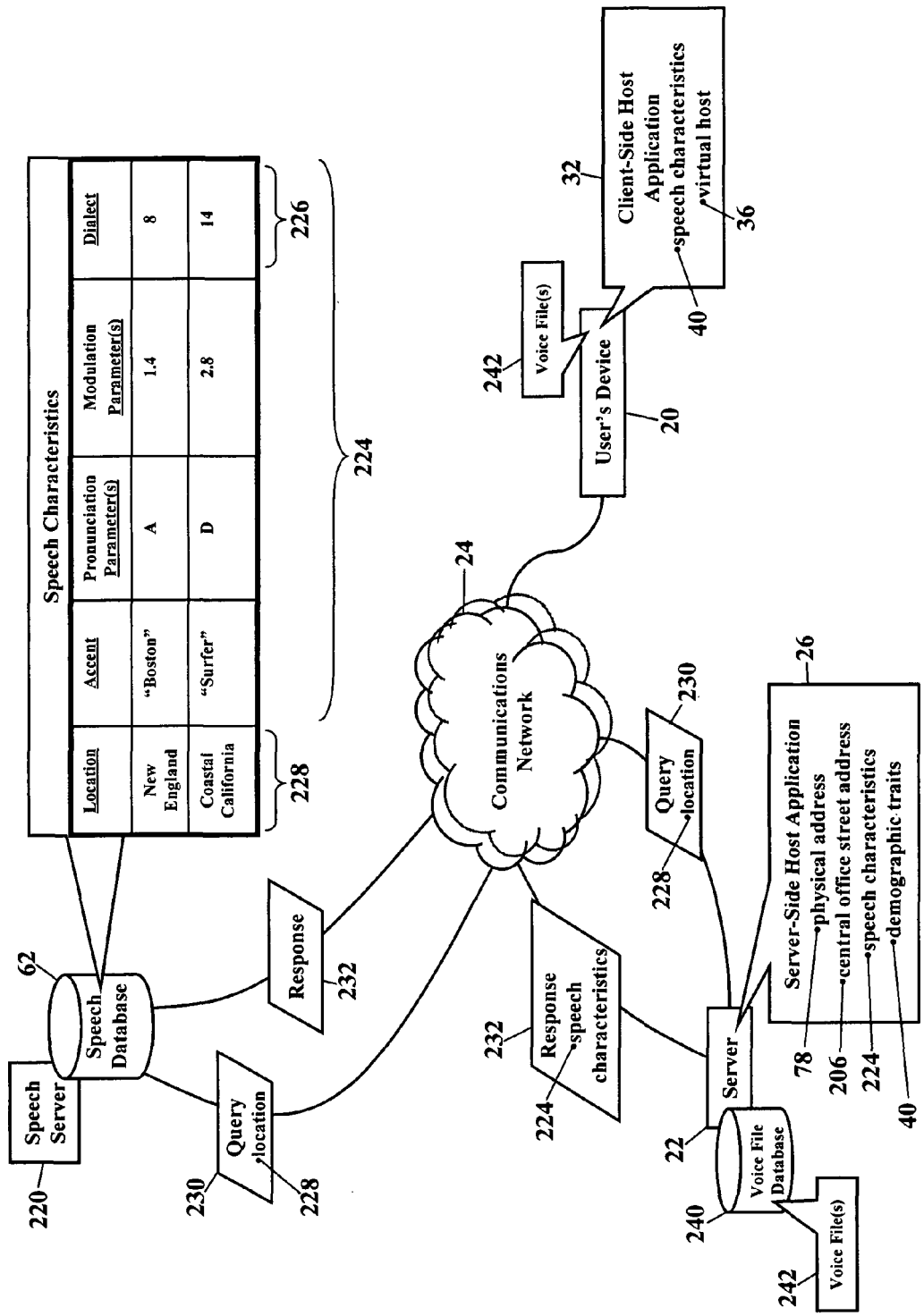
FIG. 11 is a schematic illustrating a speech database, according to still more exemplary embodiments.

FIG. 11 is a schematic illustrating the speech database 62, according to still more exemplary embodiments. The speech database 62 may be used to obtain speech characteristics that demographically match, resemble, or appeal to the user. The speech database 62 is illustrated as being remotely stored in a speech server 220, yet the speech database 62 may be locally stored in the user's device 20 and/or in the server 22. The speech database 62 stores speech characteristics 224, such as accents, pronunciations, modulations, tones, pitches, and/or other vocal characteristics. The speech database 62 may even store one or more sets 226 of dialects. As the below paragraphs explain, exemplary embodiments may select the appropriate speech characteristics 224 and/or dialect 226 and may then endow the host 36.

The speech characteristics 224 may be selected based on a location 228. As the above paragraphs explained, exemplary embodiments may obtain the physical address 78 associated with the user. Exemplary embodiments, however, may also obtain the street address 206 of the serving central office (illustrated as reference numeral 204 in FIG. 10). Whether the location 228 is obtained or inferred, the speech characteristics 224 may be chosen based on the location 228. When, for example, the user (at the user's device 20) is associated with the State of Massachusetts, exemplary embodiments may apply a "New England" or a "Boston" accent. When the location 228 is the southeastern United States, the host 36 may be endowed with a "Southern" accent. The host 36 may be endowed with a "surfer dude" accent or dialect when the location 228 indicates Huntington Beach, Calif. Exemplary embodiments, then, may use location to endow the host 36 with the speech characteristics 224 that are shared by identified by regional location.

FIG. 11 illustrates the speech database 62. The server-side host application 26 (and/or the client-side host application 32) may send a query 230 to the speech database 62. The query 230 includes information representing the location 228 (e.g., the physical address 78 and/or the central office street address 206). The speech database 62 performs a lookup and retrieves one or more of the speech characteristics 224 that are associated with the location 228. The speech database 62 then sends a query response 232, and the query response 232 includes information representing the speech characteristics 224. When the server-side host application 26 receives the query response 232, the server-side host application 26 (and/or the client-side host application 32) may then endow the host 36 with the selected speech characteristics 224.

The speech database 62, for example, may return a filename. This filename may represent a voice file to be applied to the host 36. The server-side host application 26, for example, may access a voice file database 240. The voice file database 240 is illustrated as being locally stored in the server 22, yet some or the entire voice file database 240 may be stored in the user's device 20. The voice file database 240 may even be remotely accessed via the communications network 24. The voice file database 240 stores multiple voice files 242, any of which may be applied to the host 36. Each voice file 242, for example, may comprise accents, pronunciations, modulations, tones, pitches, and/or other vocal characteristics. Each voice file 242 may comprise one or more phonemes. Each voice file 242 may comprise recordings of actual or synthetic speech that may be audibly produced on behalf of the host 36. Whatever each voice file 242 includes, each voice file 242 may endow the host 36 with different speech characteristics. One voice file, for example, may cause the host 36 to have audible content in the "Boston" accent. A different voice file may endow the host 36 with the "Southern" accent, while another voice file produces "surfer dude" speech.

The location 228, however, may not accurately reflect the user's speech. Even though the user's location 228 may be obtained or inferred, the user's speech may not match the user's location 228. Even though the user may be associated with a southeastern state, for example, the "Southern" accent may be inappropriate for a transplanted New Englander. Many residents of Atlanta, Ga., for example, are originally from other regions of the United States and of other countries. The location 228, then, may or may not be an adequate determiner of the user's accent and/or dialect.

Figure 12:
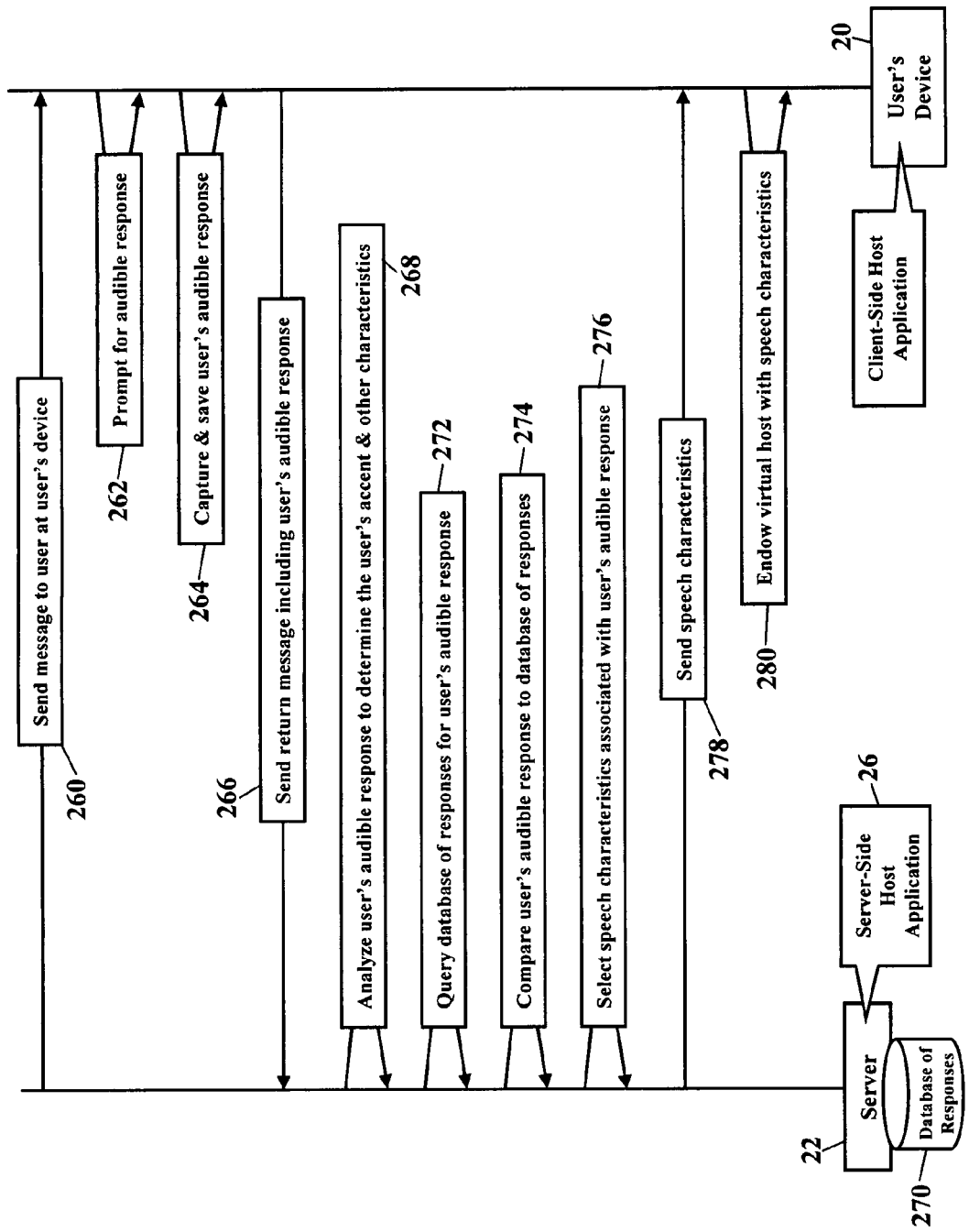
FIGS. 12 and 13 are schematics illustrating a process for distinguishing the user's speech, according to even more exemplary embodiments.

FIG. 12, then, is a schematic illustrating a process for distinguishing the user's speech, according to even more exemplary embodiments. Here exemplary embodiments prompt the user to speak words or sentences. Those words or sentences may then be analyzed to determine the user's accent and other speech characteristics. As FIG. 12 illustrates, the server-side host application 26 sends a message to the user at the user's device 20 (Block 260). The message causes the client-side host application 32 to prompt the user for an audible response (Block 262). The prompt may be visually displayed on the display device (illustrated as reference numeral 38 in FIG. 1), yet the prompt may be audibly produced by the user's device 20. Regardless, the user's audible response may be captured and saved (the user's response, for example, may be saved as a digital audio recording or file) (Block 264). The client-side host application 32 sends a return message to the server-side host application 26, and the return message includes information describing the user's audible response (Block 266). When the server-side host application 26 receives the return message, the user's audible response is analyzed to determine the user's accent and other vocal characteristics (Block 268).

The user's audible response, for example, may be compared to a database 270 of responses. The database 270 of responses is illustrated as being locally stored in the server 22, yet the database 270 of responses may be stored in the user's device 20 or remotely accessed via the communications network (illustrated as reference numeral 24 in FIGS. 1-11). The database 270 of responses may also be integrated with, or a component of, the speech database (illustrated as reference numeral 62 in FIG. 11). The database 270 of responses may store digital samples or "thumbprints" of known responses. Each response, however, may correspond to, or represent, a different speech pattern. The same phrase (e.g., "Do you sell ladies clothing?") may be sampled and stored in difference accents. One sample, for example, may digitally represent the phrase when spoken in the "Boston" accent. Another sample may digitally represent the same phrase in the "Southern" accent, while another sample digitally represents the "surfer dude" accent. The database 270 of responses may store different samples for any number of words or phrases, with the samples representing different accents, dialects, or other vocal characteristics. When the user (at the user device 20) is asked to speak that same phrase (e.g., "Do you sell ladies clothing?"), the user's audible response may be compared to the samples stored in the database 270 of responses.

The server-side host application 26 thus queries the database 270 of responses (Block 272). The database 270 of responses is queried for any samples that at least partially match the user's audible response (or that at least partially match a sample of the user's audible response). The database 270 of responses thus compares the user's audible response to its stored data (Block 274). When a match is found, the database 270 of responses selects one or more of the speech characteristics 224 that are associated with the user's audible response (Block 276). The speech characteristics 224 may describe word or syllable intensities, variations in pitch or tone, emphasis, pronunciation, or any other phonetic characteristics or qualities that may endear the host 36 to the user's vocal traits. Should the user's audible response match more than one sample in the database 270 of responses, the user may be prompted to speak additional words or phrases. Those additional words or phrases may again be successively compared to the database 270 of responses until a final set of speech characteristics 224 is determined. The speech characteristics 224 may be sent to the user's device 20 (Block 278), such that the host 36 is endowed with audible traits that match the user (Block 280).

Figure 13:
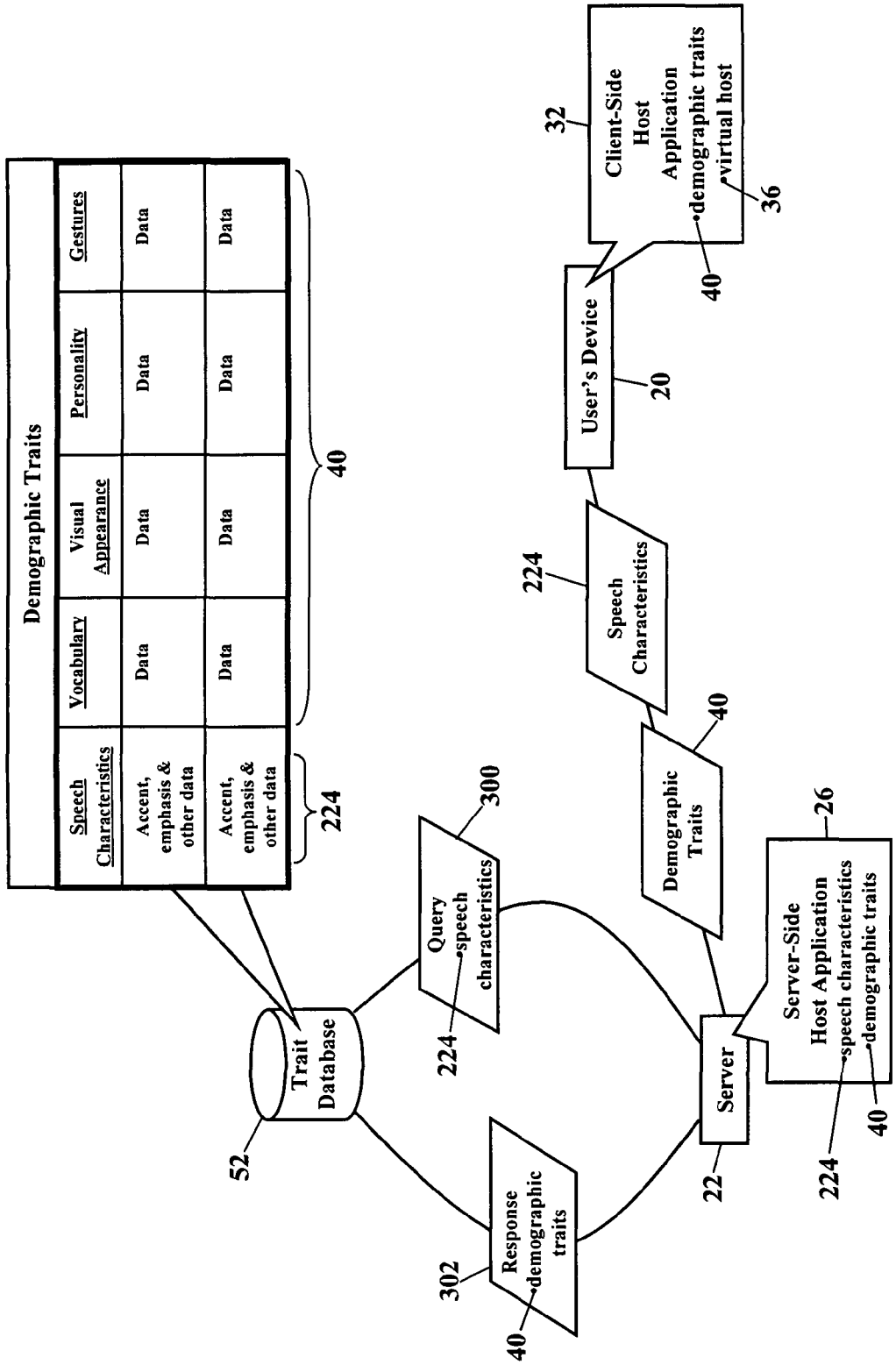

FIG. 13, then, is another schematic illustrating the trait database 52, according to even more exemplary embodiments. Once the user's speech characteristics 224 are determined, the trait database 52 may again provide the demographic traits 40. The trait database 52 may be queried for one or more of the speech characteristics 224. The server-side host application 26, for example, sends a query 300 to the trait database 52, and the query 300 includes information representing the user's speech characteristics 224. The trait database 52 retrieves the demographic traits 40 associated with the speech characteristics 224. The trait database 52 then sends a query response 302, and the query response 302 includes information representing the demographic traits 40. The trait database 52 may store clothing, color, and style parameters that are associated with the speech characteristics 224. The trait database 52 may even store mannerisms, attitude, and other personality characteristics that are desirable for the speech characteristics 224. The trait database 52, for example, may store scripted questions or dialog using terms, phrases, and other vocabularies that are demographically matched to the speech characteristics 224. The trait database 52 is used to obtain parameters that endow the host 36 with characteristics that demographically match, resemble, or appeal to the user. FIG. 13 then illustrates the server-side host application 26 sharing or communicating the speech characteristics 224 and the demographic traits 40 to the client-side host application 32. The server-side host application 26 and the client-side host application 32 may then cooperate to endow the host 36 with visual/physical and audible traits that match the user.

Figure 14:
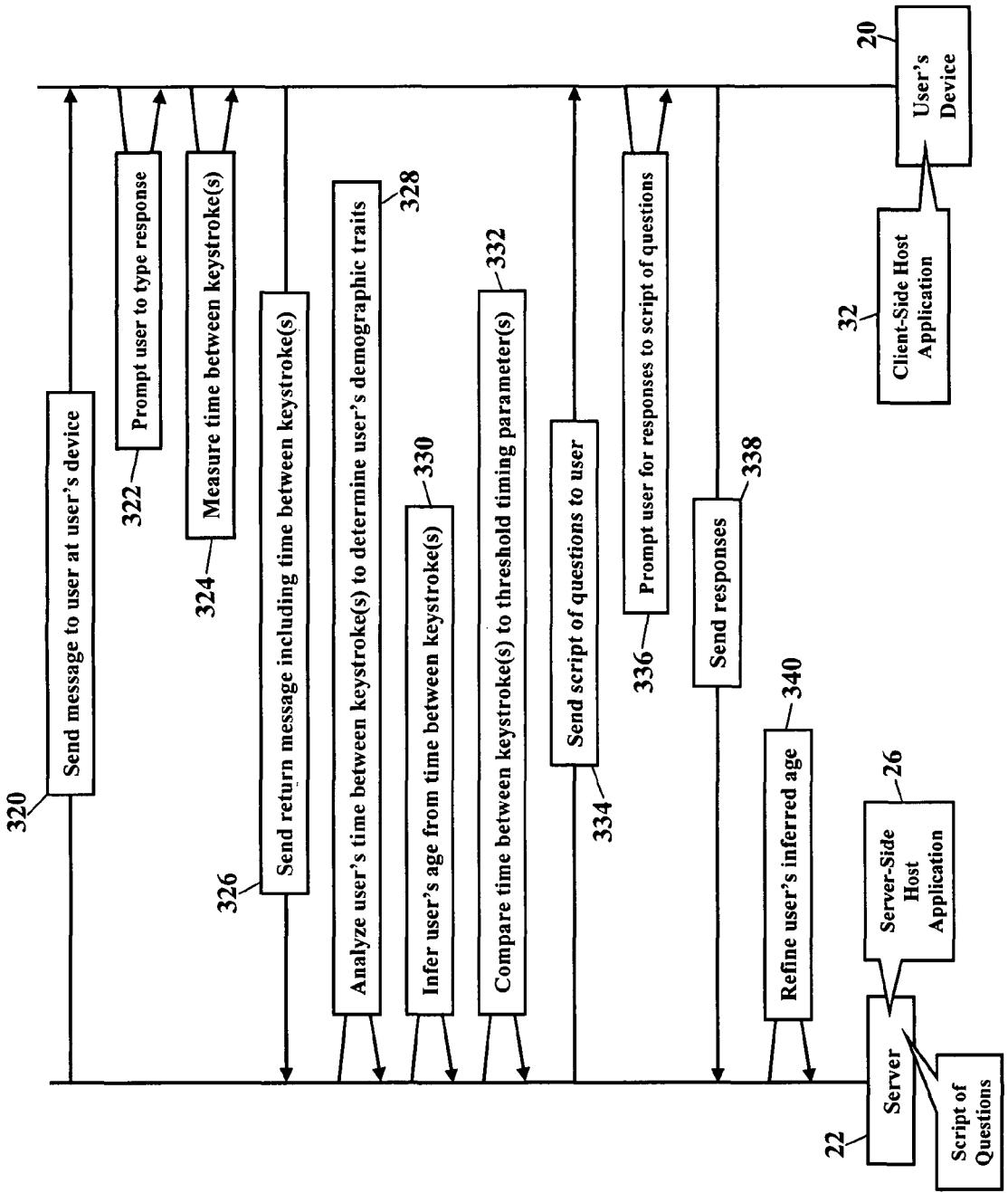
FIG. 14 is a schematic illustrating a process of inferring the user's traits, according to more exemplary embodiments.

FIG. 14 is a schematic illustrating a process of inferring the user's traits, according to more exemplary embodiments. Here exemplary embodiments may infer the user's age, and other demographic traits, from the speed at which the user types responses. The server-side host application 26 sends a message to the user at the user's device 20 (Block 320). The message prompts the user to type a response (Block 322). The user, for example, may be prompted to type "Anne of Green Gables" or any other word or phrase. As the user types or enters the response, the client-side host application 32 may measure a time between one or more keystrokes (Block 324). The client-side host application 32 then sends a return message to the server-side host application 26 (Block 326). The return message includes information representing the time between the user's keystrokes. The client-side host application 32, for example, may measure and send the actual times between each keystroke. The client-side host application 32 may additionally or alternatively send an average time between each keystroke. When the server-side host application 26 receives the return message, the actual times and/or the average time are analyzed to determine the user's demographic traits (Block 328).

The server-side host application 26, for example, may infer the user's age (Block 330). When the user slowly types, the user may be young computer user and/or an elderly user. The actual times between each keystroke, and/or the average time between each keystroke, may be compared to a threshold timing parameter (Block 332). When, for example, the actual times between each keystroke, and/or the average time between each keystroke, is less than (or equal to) the threshold timing parameter, then the user slowly types and the user may be assumed to have a young or elderly age. When the threshold timing parameter is satisfied (that is, the actual times and/or the average time is/are greater than the threshold timing parameter), then the user quickly types and may be assumed to have a middle age. This example, however, is very simple and general. The user, instead, may be craftily prompted to type phrases that may more finely define the user's age.

The server-side host application 26 may also utilize a script of questions to refine the user's inferred age. The script of questions may be craftily worded to further elicit responses that reveal the user's age. The script of questions may be stored in the server 22 or retrieved from some other local or remote location. The script of questions may be sent to the user's device 20 (Block 334), and each question prompts the user for a spoken and/or typed response (Block 336). The script of questions may include a decision tree or other logical presentation, in which the user's response determines which succeeding question is presented. The user's responses may then be sent to the server 22 (Block 338). When the server 22 receives the responses, the server-side host application 26 analyzes the responses to refine the user's inferred age (Block 340). Should, for example, the user's responses reveal a knowledge of 1940's popular culture (e.g., BETTY BOOP®, "Kilroy," or rationing stamps), the user may have fond memories of that era. If the user complains about waiting in long lines for gasoline during the early 1970's, the user may be at least of middle age. Again, the script of questions may be drafted to subtly reveal specific eras in which the user remembers or to otherwise better reveal the user's age and other demographic traits. The script of questions may be presented by the host 36 during casual interaction with the user.

The host 36 may then be endowed with the demographic traits 40. As FIG. 7 and its accompanying paragraphs explained, when the user's age can be inferred, the trait database 52 may be queried for the user's inferred age. The trait database 52 may then retrieve the demographic traits 40 that are associated with the user's inferred age. The host 36 may then be endowed with the demographic traits 40.

Figure 15:
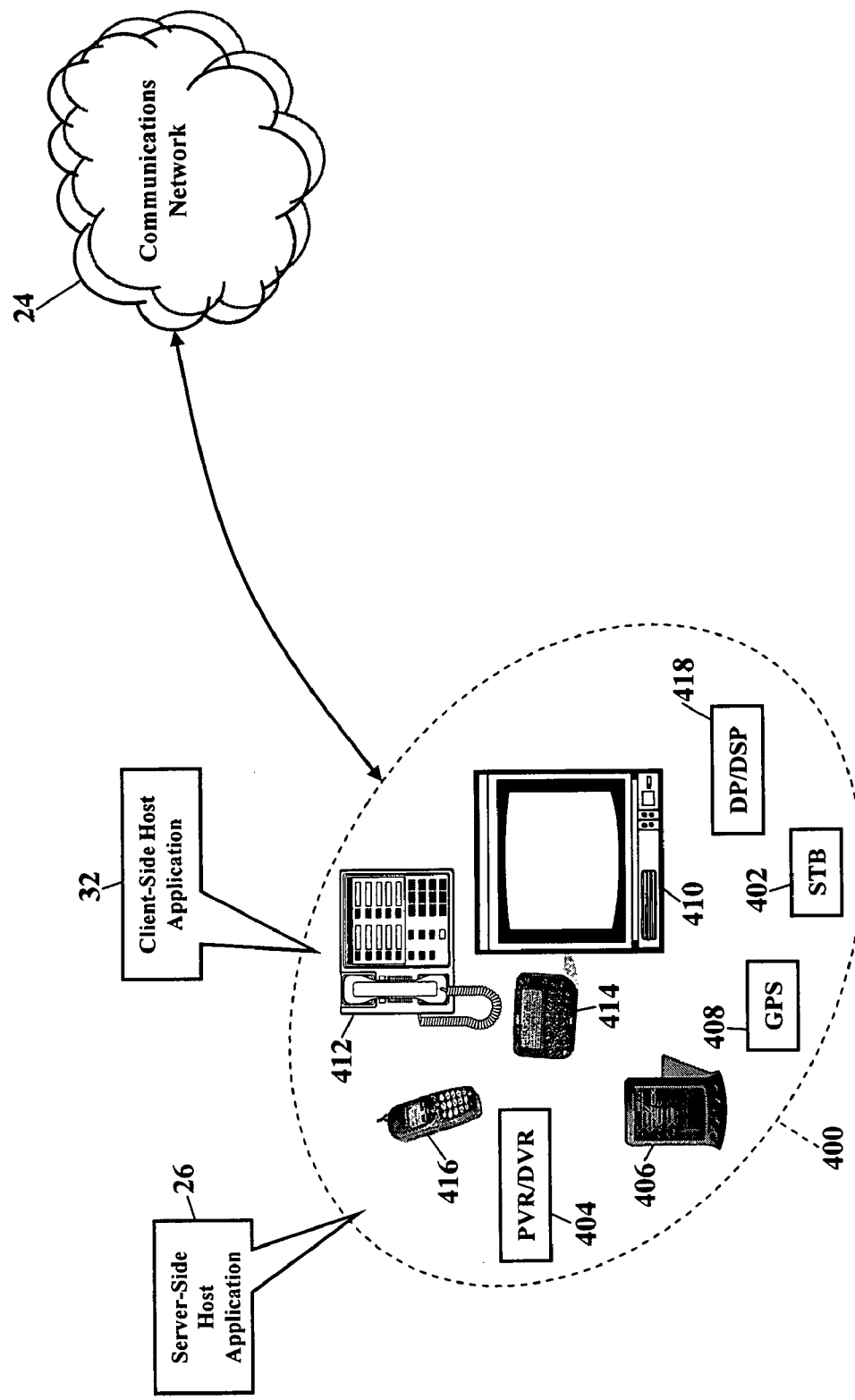
FIG. 15 depicts other possible operating environments for additional aspects of the exemplary embodiments.
Figure 16:
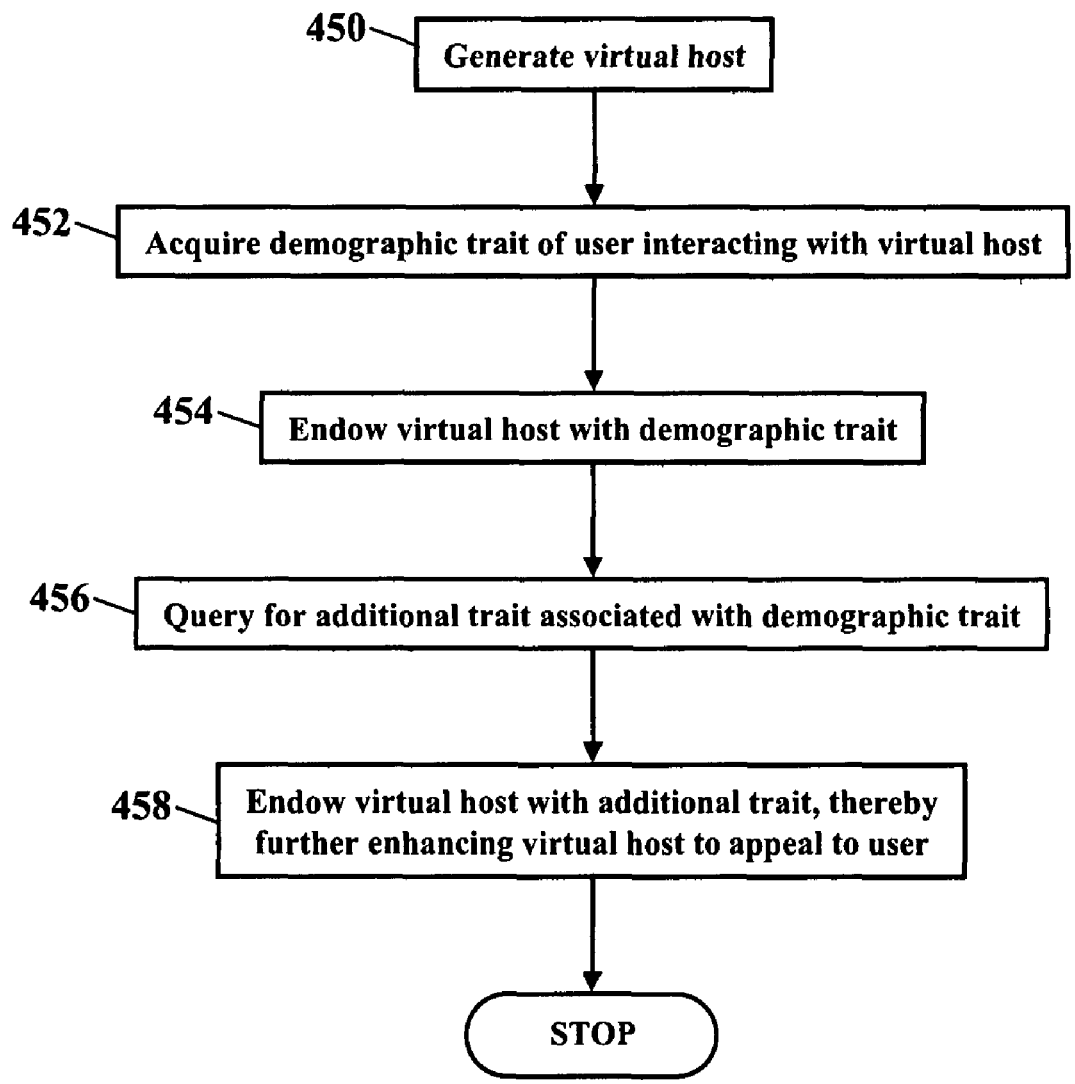
FIGS. 16-20 are flowcharts illustrating a method of producing a virtual host, according to even more exemplary embodiments.

FIG. 15 depicts other possible operating environments for additional aspects of the exemplary embodiments. FIG. 15 illustrates that the server-side host application 26 and/or the client-side host application 32 may alternatively or additionally operate within various other devices 400. FIG. 15, for example, illustrates that the server-side host application 26 and/or the client-side host application 32 may entirely or partially operate within a set-top box (402), a personal/digital video recorder (PVR/DVR) 404, personal digital assistant (PDA) 406, a Global Positioning System (GPS) device 408, an interactive television 410, an Internet Protocol (IP) phone 412, a pager 414, a cellular/satellite phone 416, or any computer system and/or communications device utilizing a digital processor and/or a digital signal processor (DP/DSP) 418. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described. If, however, the reader desires more details, the reader is invited to consult the following sources: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004).

FIGS. 16-20 are flowcharts illustrating a method of producing a host, according to even more exemplary embodiments. As the host is generated (Block 450), a demographic trait of a user, interacting with the host, is acquired (Block 452). The host is endowed with the demographic trait (Block 454), thereby enriching the host to appeal the user. A query is made for an additional trait that is associated with the user's demographic trait (Block 456). The host is also endowed with the additional trait, thereby further enhancing the host to appeal to the user (Block 458).

Figure 17:
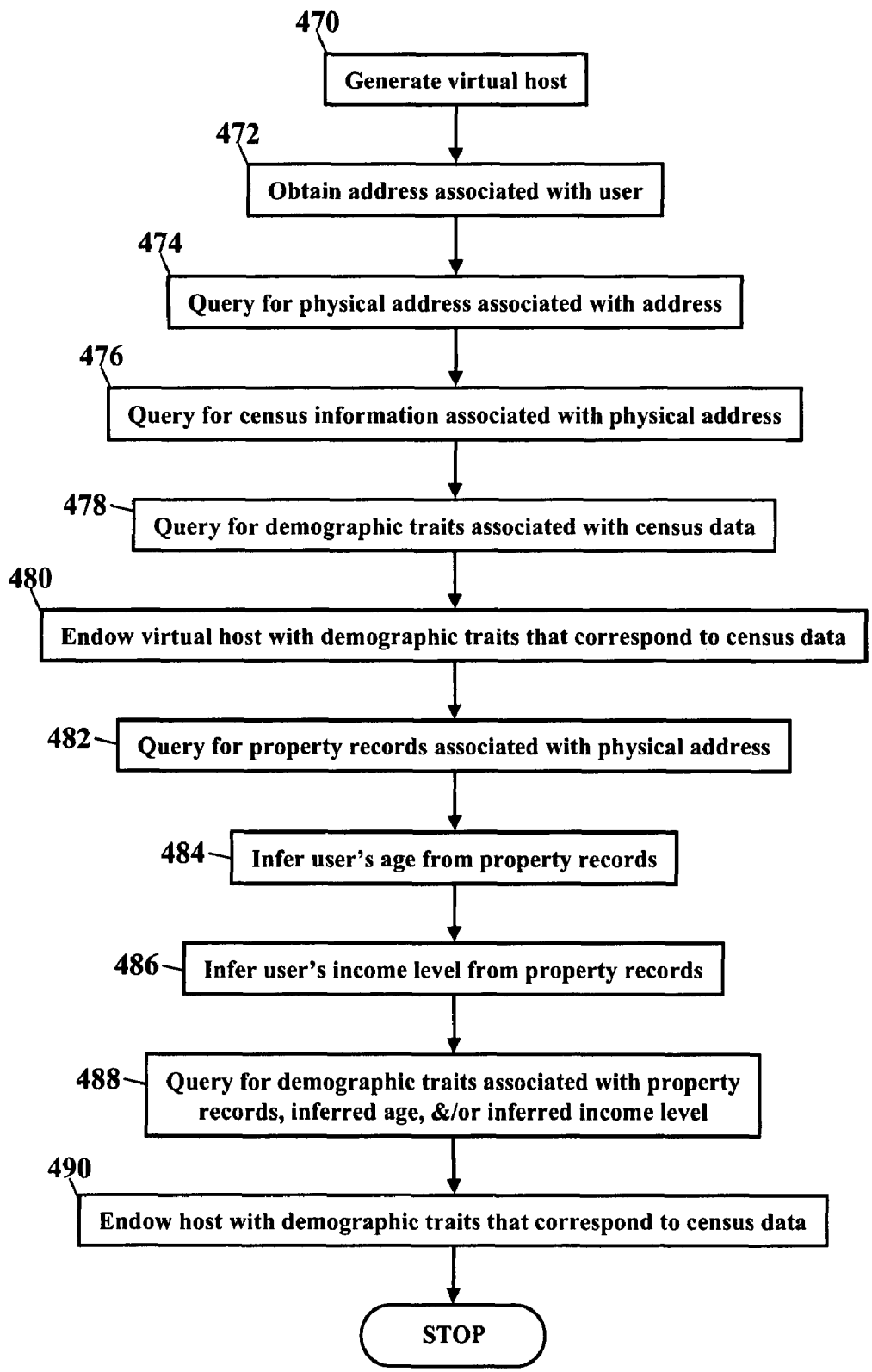

As FIG. 17 illustrates, when the host is generated (Block 470), an address (such as an Internet Protocol address) is obtained (Block 472). A query may be made for a physical address associated with the address (Block 474). A query may be made for census data associated with the physical address (Block 476). A query may be made for demographic traits associated with the census data (Block 478). The host may then be endowed with the demographic traits that correspond to the census data (Block 480). A query may be made for property records associated with the physical address (Block 482). The user's age may be inferred from the property records (Block 484). The user's income level may be inferred from the property records (Block 486). A query may be made for demographic traits associated with property records, the user's inferred age, and/or the user's inferred income level (Block 488). The host may then be endowed with the demographic traits that correspond to the property records, the user's inferred age, and/or the user's inferred income level (Block 490).

Figure 18:
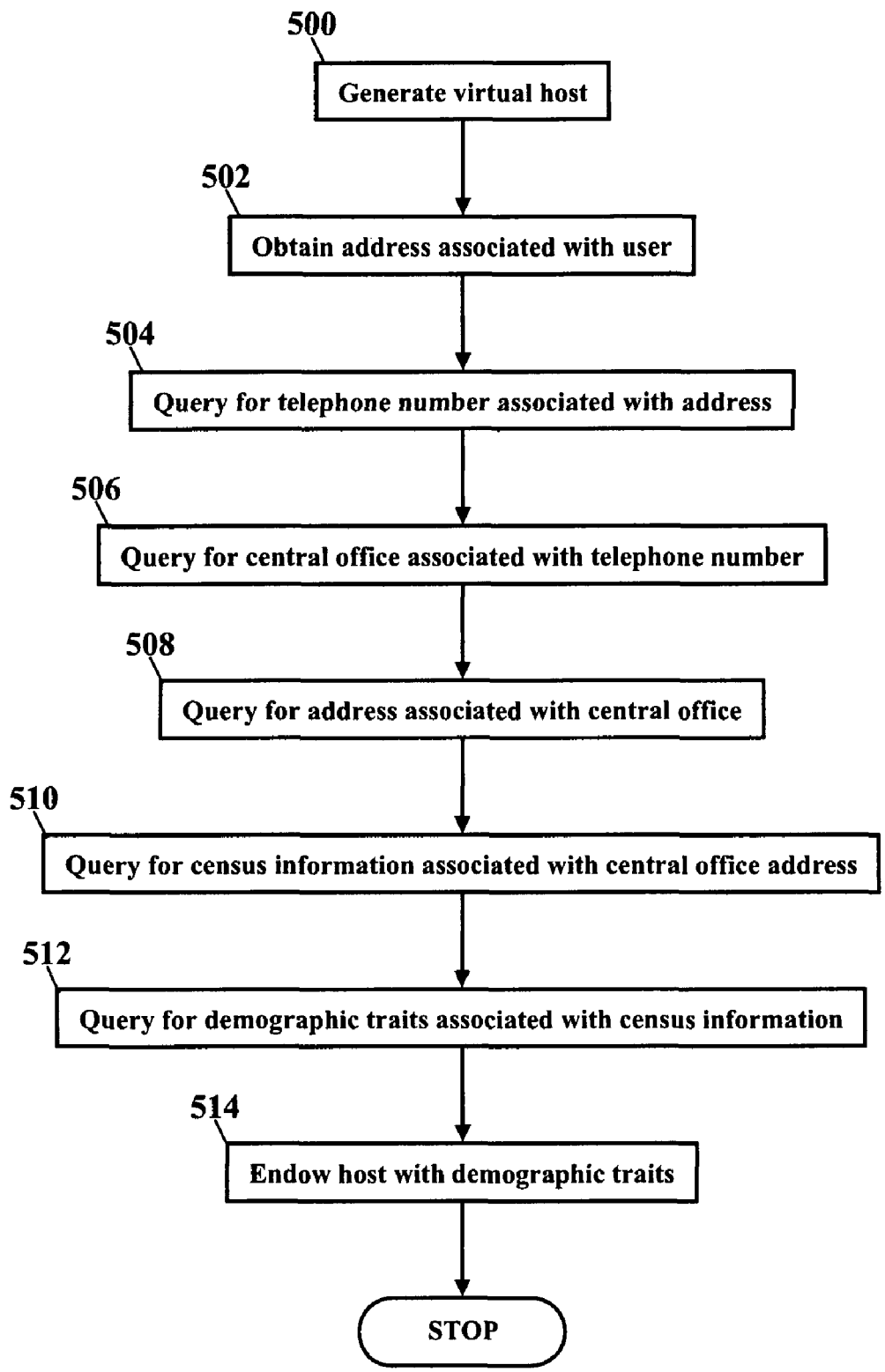

The method resumes with FIG. 18. The host is generated (Block 500) and an Internet Protocol address is obtained (Block 502). A query may be made for a telephone number associated with the Internet Protocol address (Block 504). A query may be made for a central office associated with the telephone number (Block 506). A query may be made for an address of the central office (Block 508). A query may be made for census data associated with the central office's physical address (Block 510). A query may be made for demographic traits associated with the census data (Block 512). The host may then be endowed with the demographic traits associated with the census data (Block 514), whereby the host is demographically tailored to the census data.

Figure 19:
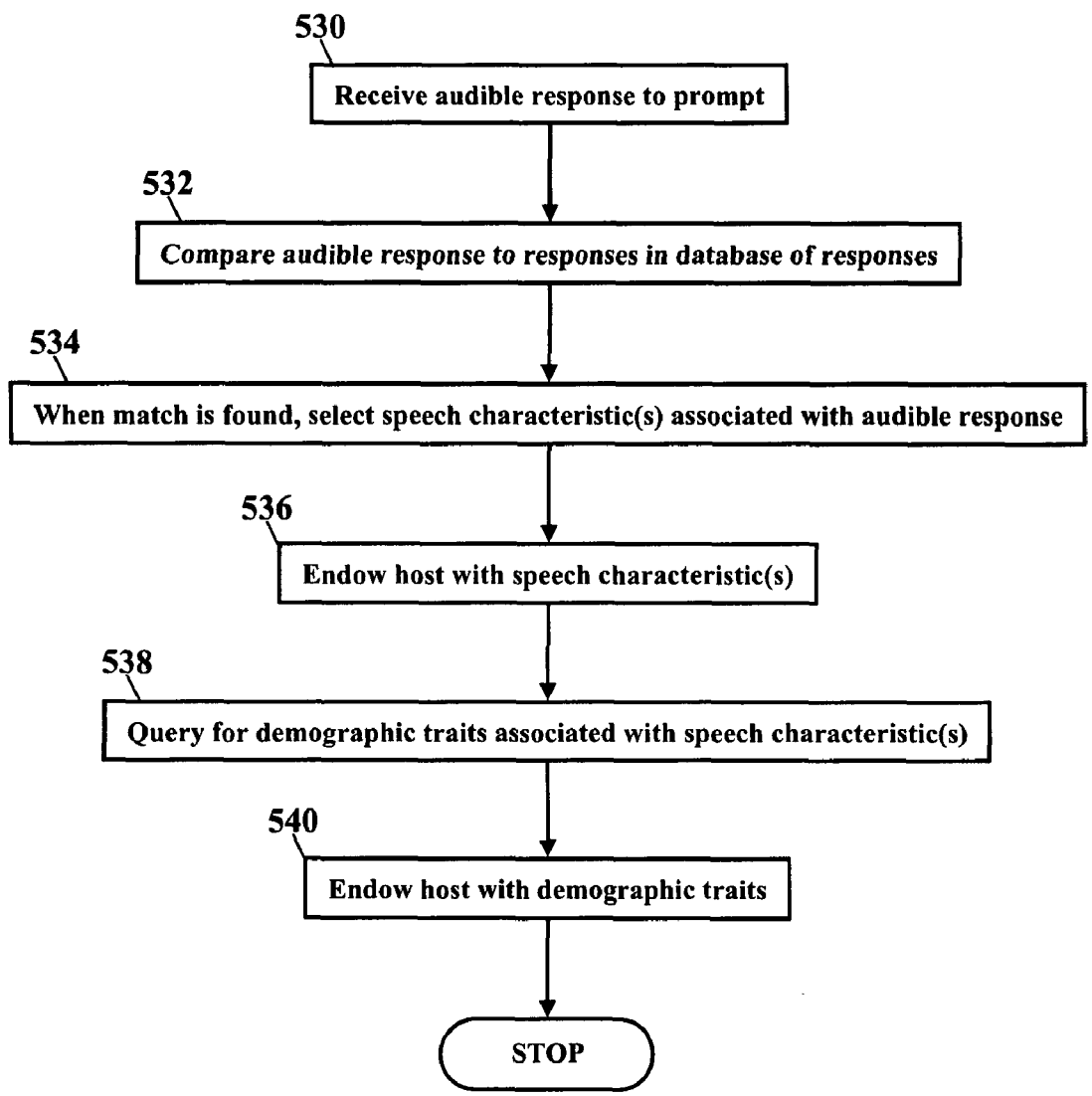

As FIG. 19 illustrates, an audible response to a prompt is received (Block 530) and compared to responses in a database of responses (Block 532). When a match is found, then a speech characteristic, associated with the audible response, is selected (Block 534). The host may then be endowed with the speech characteristic, such that the host has audible traits matching the user (Block 536). A query may be made for demographic traits associated with the speech characteristic (Block 538), and the host may also be endowed those demographic traits (Block 540).

Figure 20:
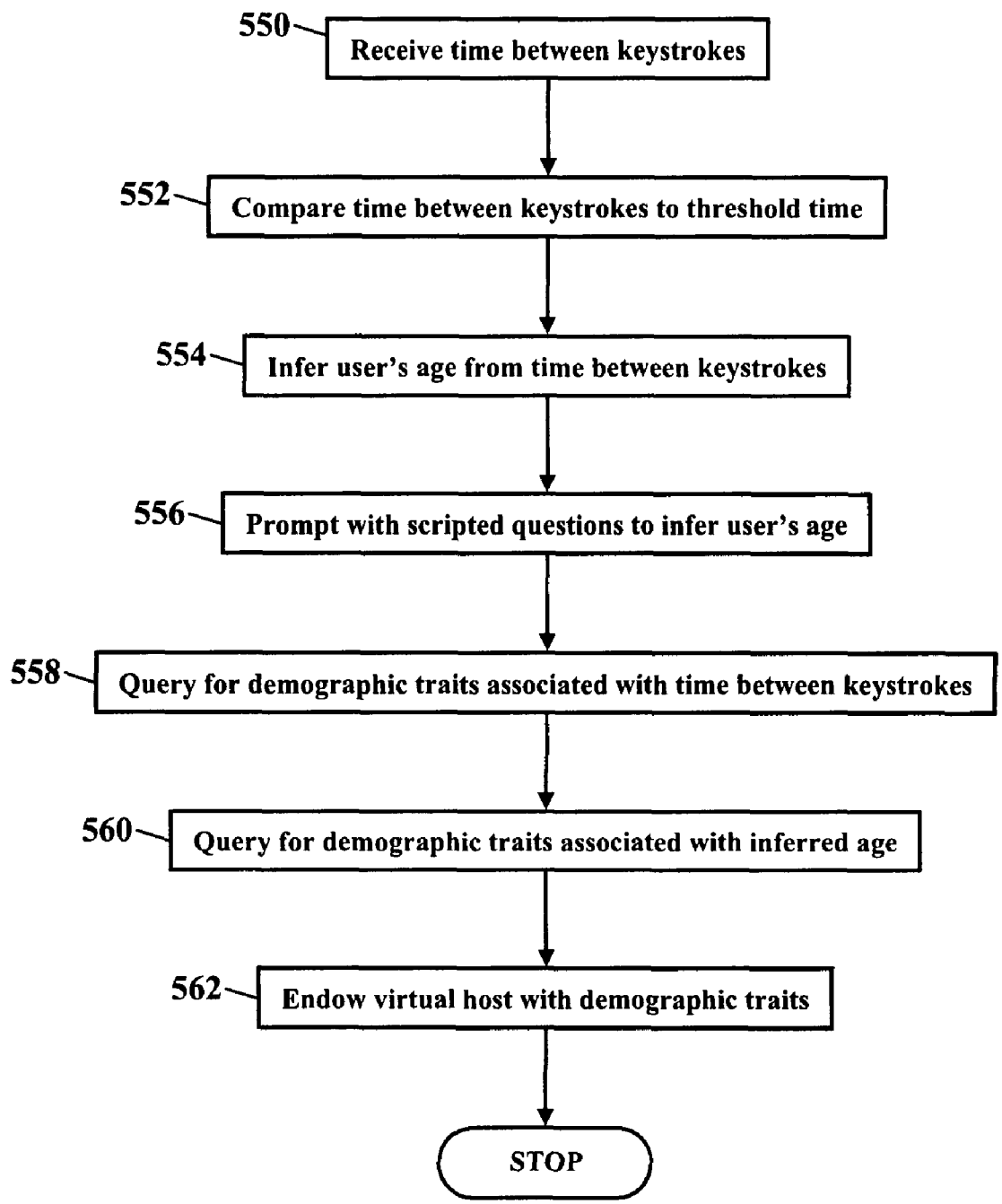

As FIG. 20 illustrates, a time between keystrokes of the user is received (Block 550). The time between keystrokes may be compared to a threshold time (Block 552). The user's age may be inferred from the time between keystrokes (Block 554). The user may be prompted with scripted questions to infer the user's age (Block 556). A query may be made for demographic traits associated with the time between keystrokes (Block 558). A query may be made for demographic traits associated with the user's inferred age (Block 560). The host may be endowed the demographic traits (Block 562).

Exemplary embodiments may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments. A computer program product comprises processor-executable instructions for verifying identity.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:
1. A method of producing a virtual host, comprising:
generating the virtual host;
obtaining a physical address associated with an internet protocol address of a user interacting with the virtual host;

obtaining property records associated with the physical address;

inspecting the property records for a date of transfer;

comparing the date of transfer to a current date to determine a term of ownership;

inferring an age of the user from the term of ownership; and endowing the virtual host with demographic traits associated with the age of the user.

2. The method according to claim 1, further comprising:

querying for an additional trait that is associated with the user's demographic trait; and endowing the virtual host with the additional trait, thereby further enhancing the virtual host to appeal to the user.

3. The method according to claim 1, further comprising querying a property records database for the property records associated with the physical address.

4. The method according to claim 3, further comprising querying for census data associated with the physical address.

5. The method according to claim 4, further comprising querying for the demographic trait associated with the census data, whereby the virtual host is demographically tailored to the census data.

6. The method according to claim 3, wherein the property records are stored in a local memory.

7. The method according to claim 1, further comprising:

inferring the age of the user from governmental data.

8. The method according to claim 1, further comprising:

inspecting the property records for a sales price;

inferring an income level of the user from the sales price; and endowing the virtual host with demographic traits associated with the income level of the user.

9. The method according to claim 1, further comprising querying for a telephone number associated with an Internet Protocol address, the Internet Protocol address associated with the user.

10. The method according to claim 9, further comprising:

querying for a physical address associated with the telephone number;

querying for census data associated with the physical address; and querying for the demographic trait associated with the census data, whereby the virtual host is demographically tailored to the census data.

11. The method according to claim 9, further comprising:

querying for a central office associated with the telephone number;

querying for a physical address of the central office;

querying for census data associated with the physical address of the central office; and querying for the demographic trait associated with the census data, whereby the virtual host is demographically tailored to the census data.

12. The method according to claim 11, further comprising:

receiving an audible response to a prompt;

comparing the audible response to responses in a database of responses;

when a match is found, then selecting a speech characteristic associated with the audible response; and endowing the virtual host with the speech characteristic such that the virtual host has audible traits matching the user.

13. The method according to claim 12, further comprising querying for the demographic trait that is associated with the speech characteristic.

14. The method according to claim 1, further comprising:

receiving a time between keystrokes of the user; and querying for the demographic trait that is associated with the time between keystrokes.

15. The method according to claim 14, further comprising comparing the time between keystrokes to a threshold time and inferring at least one of i) an elderly age of the user and ii) a young age of the user.

16. The method according to claim 15, further comprising endowing the virtual host with the demographic trait associated with the user's age.

17. The method according to claim 14, further comprising i) prompting the user with scripted questions to infer the user's age and ii) endowing the virtual host with the demographic trait associated with the user's age.

18. A system for producing a virtual host, the system comprising a processor configured to:

generate the virtual host;

obtain a physical address associated with an internet protocol address of a user interacting with the virtual host;

obtain property records associated with the physical address;

inspect the property records for a sales price;

infer an income level of the user from the sales price; and endow the virtual host with demographic traits associated with the income level of the user.

19. The system according to claim 18, wherein the processor is configured to:

query for the physical address;

query for census data associated with the physical address; and query for demographic traits associated with the census data, whereby the virtual host is demographically tailored to the census data.

* * * * *